United States Patent
Wilson et al.

(10) Patent No.: US 10,423,126 B2
(45) Date of Patent: Sep. 24, 2019

(54) MULTI-RESONANT FEEDBACK CONTROL OF A SINGLE DEGREE-OF-FREEDOM WAVE ENERGY CONVERTER

(71) Applicants: National Technology & Engineering Solutions of Sandia, LLC, Albuquerque, NM (US); Rush D. Robinett, III, Tijeras, NM (US); Ossama Abdelkhalik, Houghton, MI (US); Jiajun Song, Houghton, MI (US)

(72) Inventors: David G. Wilson, Tijeras, NM (US); Rush D. Robinett, III, Tijeras, NM (US); Ossama Abdelkhalik, Houghton, MI (US); Jiajun Song, Houghton, MI (US); Giorgio Bacelli, Albuquerque, NM (US)

(73) Assignees: National Technology & Engineering Solutions of Sandia, LLC, Albuquerque, NM (US); Michigan Technological University, Houghton, MI (US)

(*) Notice: Subject to any disclaimer, the term of this patent is extended or adjusted under 35 U.S.C. 154(b) by 44 days.

(21) Appl. No.: 15/830,752

(22) Filed: Dec. 4, 2017

(65) Prior Publication Data
US 2018/0164754 A1 Jun. 14, 2018

Related U.S. Application Data

(60) Provisional application No. 62/432,401, filed on Dec. 9, 2016.

(51) Int. Cl.
*G05B 11/38* (2006.01)
*F03B 13/16* (2006.01)
(Continued)

(52) U.S. Cl.
CPC .............. *G05B 11/38* (2013.01); *F03B 13/16* (2013.01); *F03B 13/22* (2013.01); *F03B 15/00* (2013.01);
(Continued)

(58) Field of Classification Search
CPC .......... G05B 11/38; F03B 13/16; F03B 13/22; F03B 15/00; G06F 17/142; F05B 2270/20; Y02E 10/38
See application file for complete search history.

(56) References Cited

U.S. PATENT DOCUMENTS 9,140,231 B1 * 9/2015 Wilson .................... F03B 15/00
2008/0309088 A1 * 12/2008 Agamloh ............ F03B 13/1845
290/53

(Continued)

OTHER PUBLICATIONS

Abdelkhalik, O. et al., "On the control design of wave energy converters with wave prediction", J. Ocean Eng. Mar. Energy 2(4) (2016), pp. 473-483.
(Continued)

*Primary Examiner* — Thomas C Lee
*Assistant Examiner* — Anzuman Sharmin
(74) *Attorney, Agent, or Firm* — Kevin W. Bieg

(57) ABSTRACT

A multi-resonant wide band controller decomposes the wave energy converter control problem into sub-problems; an independent single-frequency controller is used for each sub-problem. Thus, each sub-problem controller can be optimized independently. The feedback control enables actual time-domain realization of multi-frequency complex conjugate control. The feedback strategy requires only measurements of the buoy position and velocity. No knowledge of excitation force, wave measurements, nor wave prediction is needed. As an example, the feedback signal processing can be carried out using Fast Fourier Transform with Hanning windows and optimization of amplitudes and
(Continued)

phases. Given that the output signal is decomposed into individual frequencies, the implementation of the control is very simple, yet generates energy similar to the complex conjugate control.

8 Claims, 16 Drawing Sheets

(51) Int. Cl.
*F03B 15/00* (2006.01)
*G06F 17/14* (2006.01)
*F03B 13/22* (2006.01)

(52) U.S. Cl.
CPC ........ *G06F 17/142* (2013.01); *F05B 2270/20* (2013.01); *Y02E 10/38* (2013.01)

(56) References Cited

U.S. PATENT DOCUMENTS

| | | | | |
|---|---|---|---|---|
| 2010/0148504 | A1* | 6/2010 | Gerber | F03B 13/16 290/42 |
| 2014/0159822 | A1* | 6/2014 | Spahlinger | H03L 7/00 331/35 |
| 2018/0313321 | A1* | 11/2018 | Nguyen | F03B 13/08 |

OTHER PUBLICATIONS

Fusco, F. and J. V. Ringwood, "A Simple and Effective Real-Time Controller for Wave Energy Converters", IEEE Trans. Sustain. Energy 4 (1) (2013), pp. 21-30.

Fusco, F. and Ringwood, J., "Hierarchical Robust Control of Oscillating Wave Energy Converters With Uncertain Dynamics", IEEE Trans. Sustain. Energy 5(3) (2014), pp. 958-966.

Hals, J. et al., "Constrained Optimal Control of a Heaving Buoy Wave-Energy Converter", J. Offshore Mech. Arctic Eng. 133(1) (2011), pp. 011401-1-011401-15.

Hals, J. et al., "A Comparison of Selected Strategies for Adaptive Control of Wave Energy Converters", J. Offshore Mech. Arctic Eng. 133(3), 031101 (2011), pp. 031101-1-031101-12.

Li, G. et al., "Wave energy converter control by wave prediction and dynamic programming", Renew. Energy 48 (2012), pp. 392-403.

Nielson, S. R. et al., "Optimal control of nonlinear wave energy point converters", Ocean Eng. 72 (2013), pp. 176-187.

Ringwood, J. et al., "Energy-Maximizing Control of Wave-Energy Converters", IEEE Control Syst. Mag. 34(5) (2014), pp. 30-55.

Scruggs, J. et al., "Optimal causal control of a wave energy converter in a random sea", Appl. Ocean Res. 42 (2013), pp. 1-15.

Yavuz, H., "On Control of a Pitching and Surging Wave Energy Converter", Int. J. Green Energy 8(5) (2011), pp. 555-584.

* cited by examiner

FIG. 7A
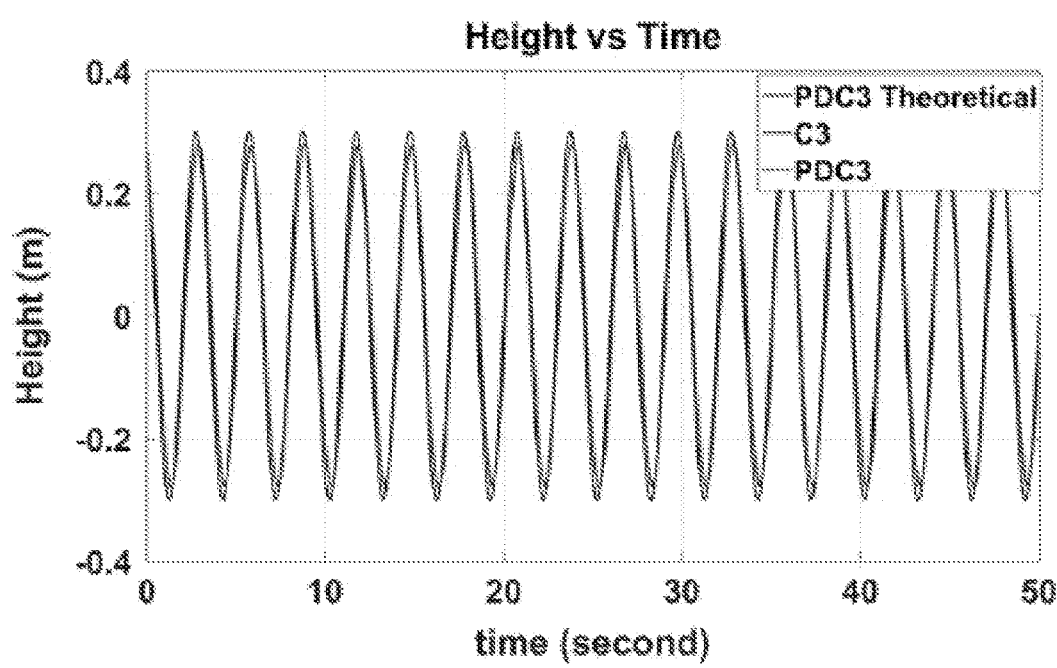
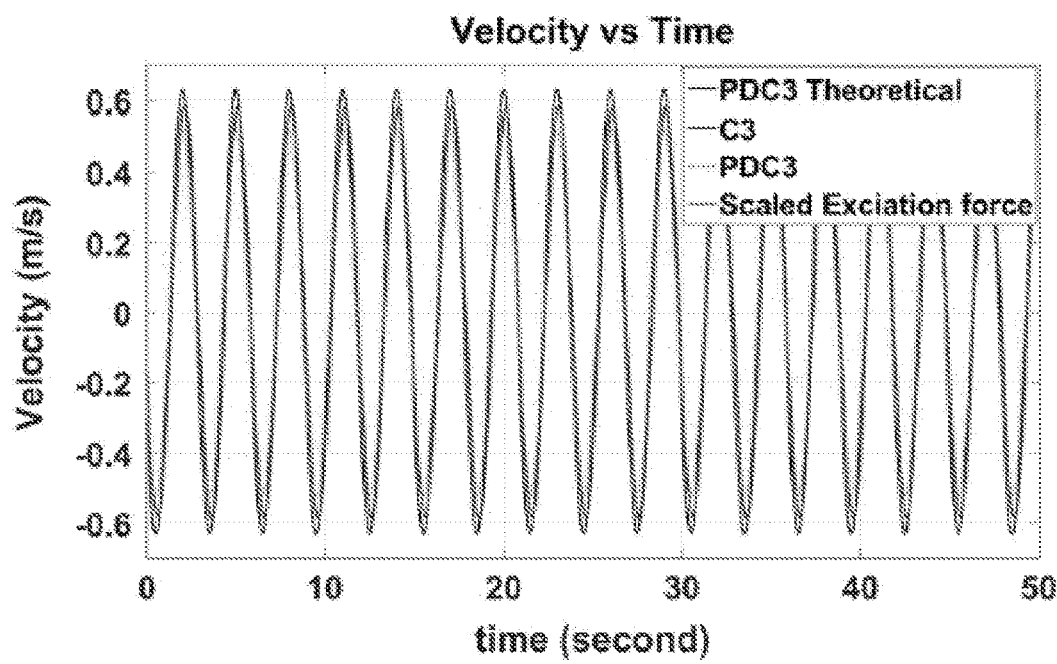
FIG. 7B

FIG. 8A
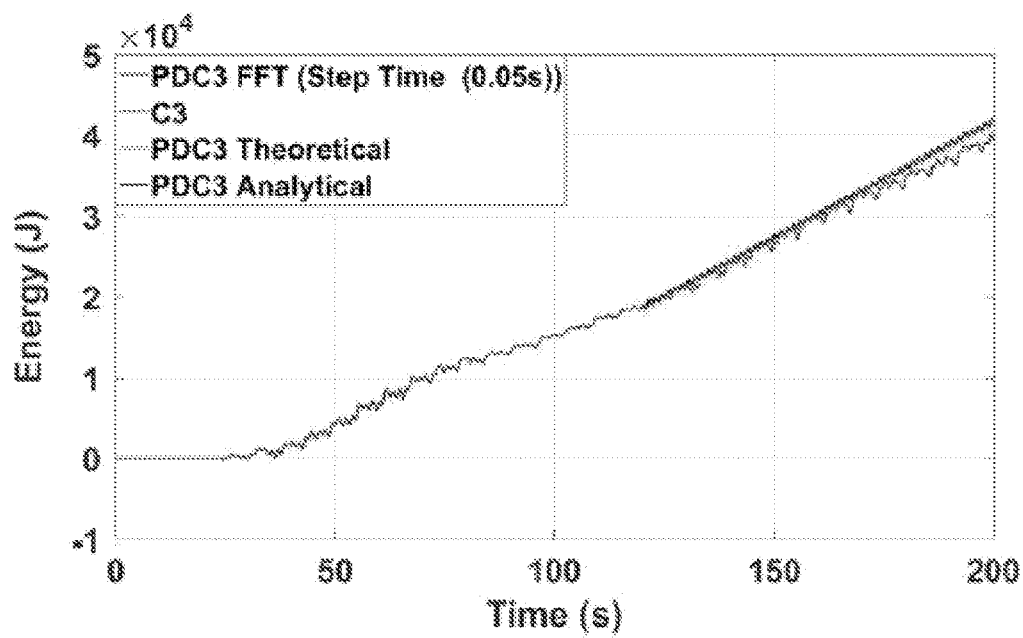
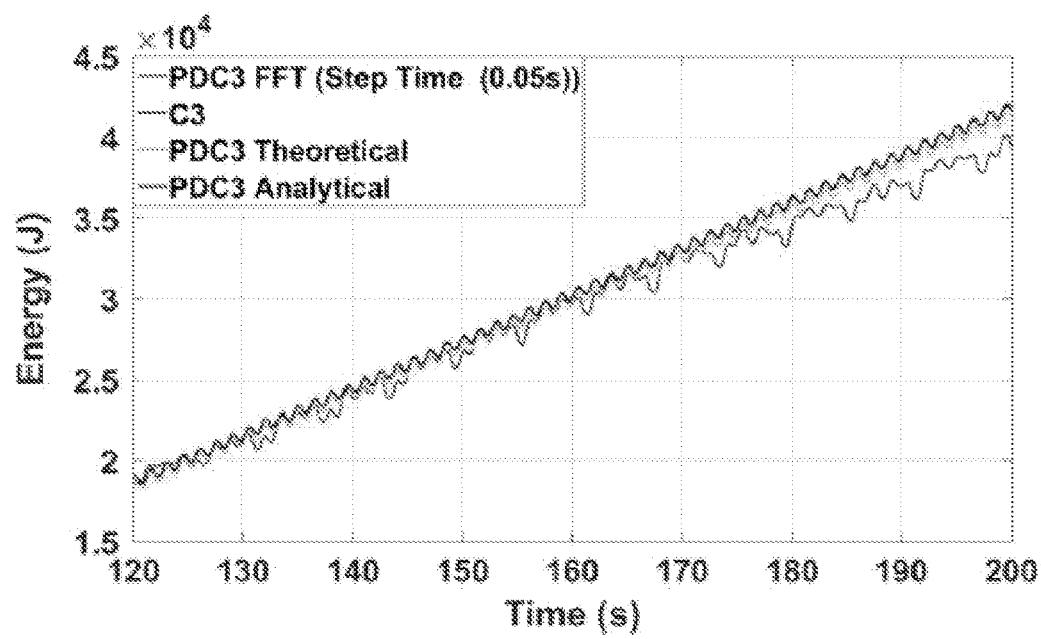
FIG. 8B

FIG. 13A
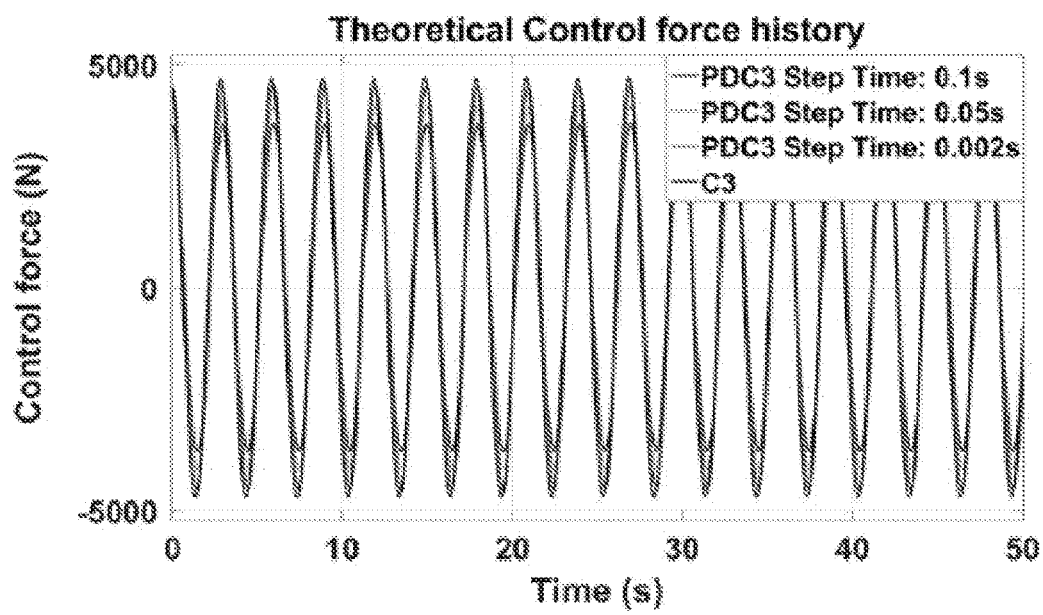
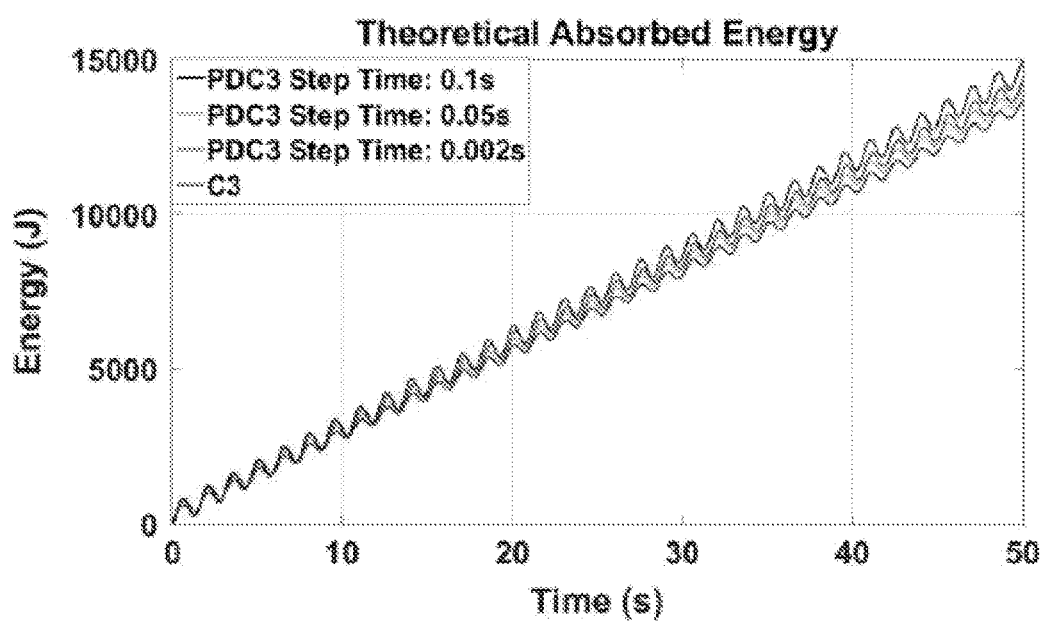
FIG. 13B

MULTI-RESONANT FEEDBACK CONTROL OF A SINGLE DEGREE-OF-FREEDOM WAVE ENERGY CONVERTER

CROSS-REFERENCE TO RELATED APPLICATIONS

This application claims the benefit of U.S. Provisional Application No. 62/432,401, filed Dec. 9, 2016, which is incorporated herein by reference. This application is related to U.S. Application titled "Multi-resonant feedback control of multiple degree-of-freedom wave energy converters," filed of even date with this application, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to wave energy conversion and, in particular, to multi-resonant feedback control of a single degree-of-freedom wave energy converter.

BACKGROUND OF THE INVENTION

Wave energy converters (WECs) are devices that extract energy from waves in an open body of water (e.g., the ocean). Due to the immensity of the oceans and the continuous movements of the waves therein, the amount of energy corresponding to waves is substantial. However, the wave energy resource is spatially, temporally, and energetically variable. For example, energy within a particular region of a body of water is dependent upon a predominant frequency of waves, wave height, and width of the wave frequency spectrum.

Several algorithms have been developed in the literature that search for the optimal solution to the control of WECs in order to maximize the energy conversion. The frequency domain analysis of a WEC heaving buoy system leads to the criterion for maximum energy conversion—known as the Complex Conjugate Control (C3) that provides a means to compute the optimal float velocity, regardless of the spectral distribution of the excitation force. See J. Falnes, *Ocean Waves and Oscillating Systems—Linear Interactions Including Wave-Energy Extraction*, Cambridge University Press, NY, USA, (2002). This C3, however, is not causal which means a prediction for the wave elevation or the excitation force is needed for real time implementation. One implementation uses a feedforward control assuming the availability of an excitation force (wave) model. See S. Naito and S. Nakamura, "Wave energy absorption in irregular waves by feedforward control system," *Hydrodynamics of Ocean Wave-Energy Utilization*, International Union of Theoretical and Applied Mechanics, Springer, Berlin, Heidelberg, pp. 269-280 (1986). Another feedback implementation computes the control force using both measurements and wave prediction data. See U. A. Korde et al., "Time domain control of a single mode wave energy device," *Proceedings of the Eleventh International Offshore and Polar Engineering Conference*, Stavanger, Norway, pp. 555-560 (2001); and U. Korde, *Ocean Eng.* 26(7), 625 (1999). A velocity-tracking approach can also be used to implement the C3 where estimates of the excitation force are used to compute the optimal float velocity (through the feedforward loop) which is imposed on the WEC through a feedback loop. See C. Maisondieu and A. Clement, "A realizable force feedback-feedforward control loop for a piston wave absorber," 8*th International Workshop on Water Waves and Floating Bodies*, St John's, Newfoundland, Canada, pp. 79-82 (1993). In all these C3 implementations, a prediction for the wave elevation and/or the wave excitation force is necessary.

Constraints on motions and forces, however, have motivated researchers to look for solutions in the time domain. In general, the solution of the constraint optimization problem is different from that of the unconstrained C3. The basic latching and declutching control strategies are attractive in that they do not require reactive power. See J. Hals et al., *J. Offshore Mech. Arctic Eng.* 133(1), 011401 (2011). In latching, the optimum oscillation phase is achieved by holding the absorber fixed during parts of the cycle. In clutching, it is achieved via coupling and decoupling the machinery at intervals. See G. Nolan et al., "Optimal damping profiles for a heaving buoy wave energy converter," *Proceedings of the Fifteenth International Offshore and Polar Engineering Conference ISOPE*, Seoul, Korea (2005); and J. Hals et al., *J. Offshore Mech. Arctic Eng.* 133(3), 031101 (2011). Babarit et al. show that clutching is theoretically better than pseudocontinuous control that has a linear damping effect. See A. Babarit et al., *Ocean Eng.* 36(12-13), 1015 (2009). Clement and Babarit investigate the use of discrete control over continuous control, for latching control, declutching control, and the combination of both. The latter gives better results than each one individually; and the discrete control is always better when it is absolute, switching instantaneously from one model to the other. See A. H. Clement and A. Babarit, *Philos. Trans. R. Soc. Lond. A: Math. Phys. Eng. Sci.* 370, 288 (2012). Allison et al. apply a direct transcription approach to maximize the energy extraction. The results show that the direct transcription method generates a latching behavior for the cases with power constraints, while the declutching behavior only results when the tether goes slack. See J. T. Allison et al., "Wave energy extraction maximization using direct transcription," *ASME* 2012 *International Mechanical Engineering Congress and Exposition, Design, Materials and Manufacturing, Parts A, B, and C, vol.* 3. ASME, Houston, Tex., USA, pp. 485-495 (2012).

Hals et al. compare various control strategies for a point absorber, including velocity-proportional control, approximate C3, approximate optimal velocity tracking, and model predictive control. See J. Hals et al., *J. Offshore Mech. Arctic Eng.* 133(1), 011401 (2011). The Model Predictive Control (MPC) methods use a discrete time model for predicting the states in the future to form the objective function for energy optimization. Kracht et al. compare several control strategies experimentally, including Proportional-Integral (PI) control and MPC. See P. Kracht et al., "First results from wave tank testing of different control strategies for a point absorber wave energy converter," 2014 *Ninth International Conference on Ecological Vehicles and Renewable Energies (EVER)*, Monte-Carlo, Monaco, pp. 1-8 (2014). The authors have found that MPC can significantly improve energy absorption when compared to the PI control. However, MPC needs a reliable estimation of the incoming incident wave, and the performance improvement is sensitive to the quality of the wave estimation. A PID control is used by Beirao et al. in which the controller gains are optimized for certain wave environments using information about the excitation force. See P. Beirao et al., "Identification and phase and amplitude control of the archimedes wave swing using a PID and IMC," *Second International Conference on Electrical Engineering*, Coimbra, ISEC (2007). A variety of feedback control laws were developed using the C3 optimality conditions in Nielsen et al. See S. R. Nielsen et al., *Ocean Eng.* 72, 176 (2013). For example, the optimal velocity trajectory can be estimated, via wave estimation, and used along with the actual velocity in a feedback control system that aims at tracking the estimated optimal velocity. A linear quadratic Gaussian optimal control can be used to track optimal velocity as in Scruggs et al. See J. Scruggs et al., *Appl. Ocean Res.* 42, 1 (2013). One of the relatively recent WEC control optimization methods that can accommodate constraints on the control and the states is dynamic programming. See G. Li et al., *Renew. Energy* 48, 392 (2012). A prediction for the wave is needed when using dynamic programming, and a discretization for the time and space domains makes the computational cost of the method feasible for real time implementation. Another time domain strategy that can also handle constraints on both the control and the states is the pseudo-spectral method. In pseudo-spectral methods, the system states and control are assumed as series of basis functions, and the search for the solution is conducted using the assumed approximate functions. See G. Bacelli et al., "A control system for a self-reacting point absorber wave energy converter subject to constraints," *Proceedings of the 18th IFAC World Congress*, Milano, Italy, pp. 11387-11392 (2011). A shape-based approach was recently developed for WEC control where a series expansion is used to approximate only the buoy velocity; this method can also accommodate motion constraints. See O. Abdelkhalik et al., "Control optimization of wave energy converters using a shape-based approach," *ASME Power & Energy* 2015, ASME, San Diego, Calif. (2015); and O. Abdelkhalik et al., *J. Ocean Eng. Mar. Energy* 2(4), 473 (2016). A key optimality criterion is to make the buoy oscillation in phase with the excitation force. Fusco and Ringwood present a time domain control that meets this criterion and maintains the amplitude of the oscillation within given constraints. See F. Fusco and J. V. Ringwood, *IEEE Trans. Sustain. Energy* 4(1), 21 (2013). A nonstationary harmonic approximation for the wave excitation force is used. The controller tunes the ratio between the excitation force and the velocity in real-time for performance and constraints handling. A performance close to C3 and to MPC is achieved. Recently, an adaptive wave-by-wave control was developed such that the oscillation velocity closely matches the hydrodynamically optimum velocity for best power absorption. Such control requires prediction of the wave profile using up-wave measurements. See U. Korde et al., "Approaching maximum power conversion with exergy-based adaptive wave-by-wave control of a wave energy converter," *Proceedings of MTS/IEEE OCEANS*, Genova, Italy (2015). In a more recent feedforward implementation, Korde investigates wave-by-wave control of a WEC using deterministic incident wave prediction based on up-wave surface measurement. See U. Korde, *Appl. Ocean Res.* 53, 31 (2015).

However, a need remains for a WEC that can efficiently extract wave energy over a full range of wave frequencies and that does not require prediction of the wave excitation force.

SUMMARY OF THE INVENTION

The present invention is directed to a multi-resonant single degree-of-freedom wave energy converter, comprising a buoy in a water environment having wave motion, wherein the waves impacting the buoy exert an excitation force with a plurality of excitation frequencies that causes a buoy motion in a heave direction relative to a reference, a sensor for measuring a position or velocity of the buoy relative to the reference for a sample period, a power take-off that is configured to apply a control force in the heave direction to the buoy and harvest the energy of the buoy motion, and a feedback controller that uses a signal processor to extract a plurality of frequencies, amplitudes, and phases of the measured position or velocity of the buoy, computes a proportional-derivative control for each of the plurality of extracted frequencies, amplitudes, and phases, adds up each of the proportional-derivative controls to provide a computed control force, and causes the power take-off to apply the computed control force to the buoy to put the buoy heave motion in resonance with the excitation force (i.e., when the buoy velocity is in phase with the wave excitation force). The signal processor can comprise a Fast Fourier Transform processor. The plurality of frequencies can comprise at least three frequencies having the most significant amplitudes. The sample period can be 6 to 8 periods of one of the plurality of frequencies.

The invention is further directed to a method for proportional-derivate complex conjugate control of a wave energy converter, comprising providing a multi-resonant single degree-of-freedom wave energy converter, measuring the position or velocity of the buoy relative to the reference over a sample period with the sensor, extracting a plurality of frequencies, amplitudes, and phases of the measured position or velocity of the buoy using the signal processor, computing a proportional-derivative control for each of the plurality of frequencies, amplitudes, and phases, adding up each of the proportional-derivative controls to provide a computed control force, and causing the power take-off to apply the computed control force to the buoy to put the buoy heave motion in resonance with the excitation force.

BRIEF DESCRIPTION OF THE DRAWINGS

The detailed description will refer to the following drawings, wherein like elements are referred to by like numbers.

FIGS. 7A and 7B show simulations for both actual and theoretical PDC3 of the buoy position and the buoy velocity, respectively.

FIGS. 8A and 8B show simulations for PDC3, theoretical PDC3, analytical PDC3, and C3 for a three-frequency excitation force.

FIGS. 13A and 13B are graphs of the control force and extracted energy. As the time step gets smaller the difference between the PDC3 and the C3 gets smaller.

DETAILED DESCRIPTION OF THE INVENTION

Figure 1:
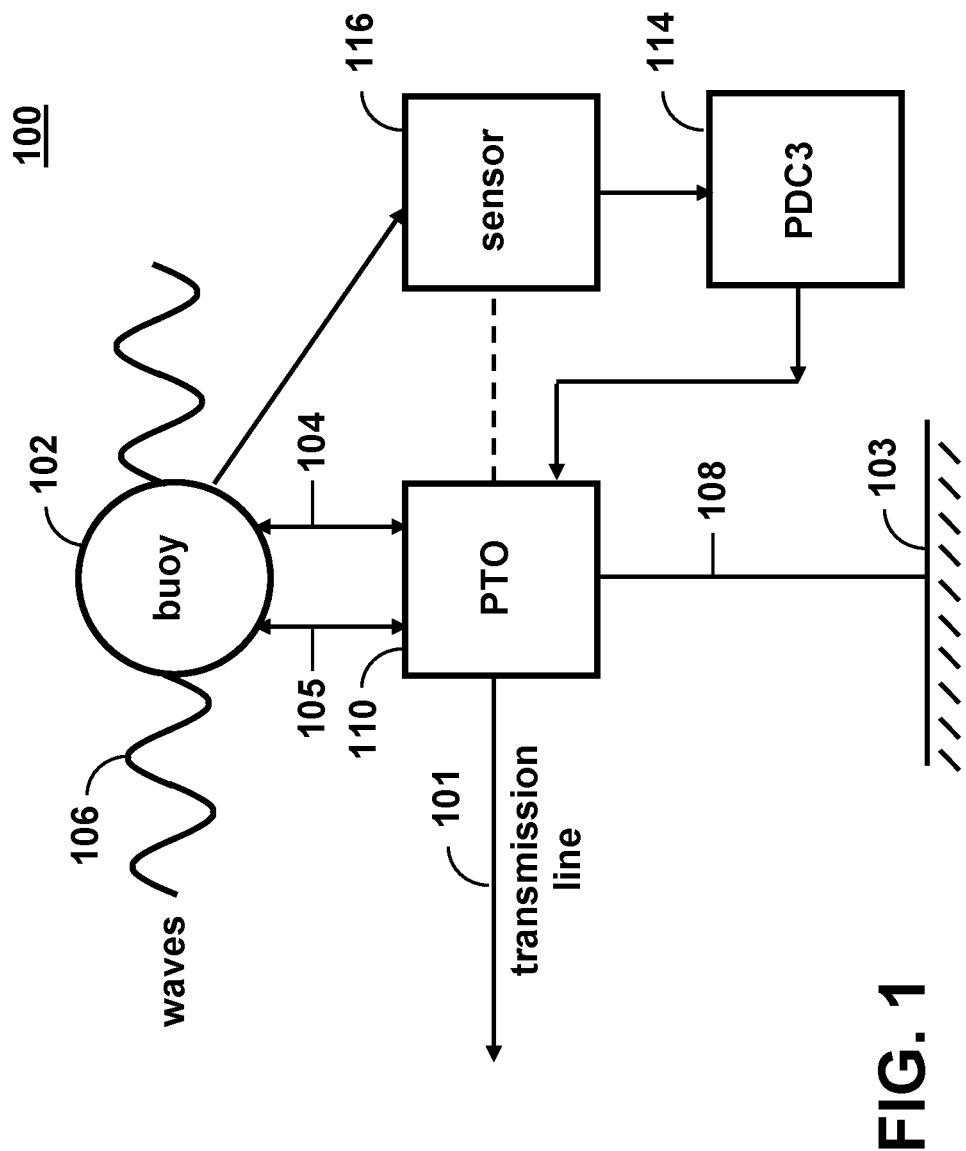
FIG. 1 is a schematic illustration of a wave energy converter (WEC).

Conventionally, WECs produce power over a relatively narrow band of the full wave frequency spectrum. Typically, a conventional WEC is configured to have a structural resonant frequency that desirably matches the dominant frequency of waves in a region where the WEC is to be deployed. Thus, when a wave impacts the WEC that causes the WEC to be on resonance, the WEC can operate efficiently, and can absorb a significant amount of energy from the wave. However, if the WEC is off resonance—e.g., waves impact the WEC that cause the WEC to be off resonance—the WEC operates with much less efficiency.

The present invention is directed to multi-resonant feedback control of a single degree-of-freedom (i.e., heave mode) WEC that can efficiently extract wave energy over a full range of wave frequencies. The controller uses a time-domain approximation for complex conjugate control in the sense that it is an approach to an optimal solution through impedance matching. The theoretical underpinnings of complex conjugate control are fundamentally linear, and the controller exploits the linear control theory to provide complex conjugate control in the time domain. The controller does not need wave prediction or wave measurements. The controller uses a feedback strategy that has a multi-resonant generator or actuator. It targets both amplitude and phase through feedback that is constructed from individual frequency components that come from the spectral decomposition of a buoy motion measurement signal. Each individual frequency uses a proportional-derivative control to provide both optimal resistive and reactive elements. By resonating each frequency component and summing them together, the controller feedback maximizes the amount of power absorbed by the WEC. As will be described below, the proportional-derivative complex conjugate control (PDC3) method of the present invention operates over multiple frequency wave spectrum content and requires only reactive power (it does not require wave prediction).

The invention can be used with a variety of WECs and controllers thereof. A WEC generally includes a buoy coupled by a mechanical energy conversion chain to an ocean floor mooring or a moveable spar, where waves impacting the WEC cause the buoy to move relative to the reference mooring or spar. The WEC has a resonant frequency, such that when waves cause the WEC to be at resonance, relatively large amplitude movement occurs between the buoy and the reference. The mechanical energy conversion chain includes a power take-off (PTO), which outputs electrical energy responsive to movement of the buoy and the reference relative to one another. The controller can further control the PTO to act as a motor, which can affect the natural displacement (movement) of the buoy relative to the reference. Generally, the controller can cause the WEC to stay on resonance when wave frequency would otherwise cause the WEC to go off resonance as well as return movement of the WEC to the resonance frequency relatively quickly when the WEC is off resonance. For example, various technologies pertaining to designing and implementing a controller in a WEC, wherein the controller is configured to improve efficiency of the WEC by expanding a wave frequency spectrum over which the WEC can efficiently absorb wave energy, are described in related U.S. Pat. No. 9,140,231, which is incorporated herein by reference.

An exemplary WEC 100 is illustrated in FIG. 1. The WEC 100 is intended to be placed in a body of water (e.g., the ocean) and subjected to wave motion of varying amplitude and frequency. The WEC 100 can be classified as a resonant responder, as its structural design can have a resonance frequency that is within a predominant wave frequency spectrum of the body of water in which the WEC 100 is deployed. When a series of waves 106 of the resonance frequency impact the WEC 100, the WEC 100 will resonantly respond, thus absorbing a relatively large amount of energy of the waves that are impacting the WEC. Thus, the WEC 100 can be configured to convert incident energy existent in waves into mechanical energy. The harvested mechanical energy is than transformed into electrical energy, and can be transmitted from a PTO 110 by way of a transmission line 101 to a substation or other suitable energy or transmission system. Additionally, while not shown, the WEC 100 can include local storage, such as a battery, a capacitor bank, or the like, that can at least temporarily retain DC energy in the WEC 100. Further, the WEC 100 can extract such stored energy when needed, wherein extracted energy can be used to control the operation of the WEC 100, to provide power to lights on the WEC, to provide power to sensors on the WEC, to provide power to a processor or circuit that processes sensor data, to provide power to a transceiver that communicates to another system or WEC, etc.

The exemplary WEC 100 is shown includes a buoy 102 that is mechanically coupled to a reference, in this example a stationary reference anchored to an ocean-floor mooring 103. The buoy 102 is designed to generally move up and down in a heaving motion in phase with waves 106 in a body of water. Such body of water can be an ocean, a sea, a relatively large lake, etc. As shown, the reference can remain stationary (e.g., anchored to an ocean-floor mooring) as the buoy 102 moves. While the exemplary WEC 100 shown is the simple case of a one-body resonant WEC, aspects described herein are not limited to a one-body absorber. Rather, aspects described herein can be utilized in any resonant WEC, including a two-body resonant WEC, wherein the buoy moves relative to a moveable spar, or an n-body resonant WEC.

A mechanical energy conversion chain 108 couples the buoy 102 and the reference 103. The mechanical energy conversion chain 108 includes a PTO 110. The PTO 110 is configured to convert the motion of the buoy 102 to electrical energy, which can then be output by way of a transmission line 101. For example, the PTO 110 can include mechanical elements that are generally utilized, for example, to translate the vertical (heave) motion 105 of the buoy 102 into rotary motion. The PTO 110 can further include a generator that is configured to translate the rotary motion into electrical energy. Exemplary mechanical elements that can be included in the PTO 110 include, but are not limited to, a rack and pinion system, a hydraulic system, a flywheel, or a ball screw. Additional elements that can be included in the PTO 110 include, but are not limited to, a water turbine, an air turbine, a linear generator, etc.

As indicated above, the WEC 100 can be structurally designed to have a resonant frequency within a predominant spectral range of waves 106 in the body of water. Accordingly, when waves corresponding to the resonant frequency of the WEC 100 impact the WEC 100, relatively large amplitude vertical motion is created between the buoy 102 and the reference 103, wherein such motion is translated by the PTO 110 into electrical energy. Conventional WECs, however, tend to be relatively inefficient when waves 106 in the body of water do not correspond to the resonant frequency of the WEC 100.

To that end, the WEC 100 can include a controller 114 that is configured to control operation of the PTO 110 to cause the PTO 110 to generate larger amounts of electrical energy over time when compared to conventional WECs. According to the present invention, the controller 114 can be a proportional-derivative complex conjugate control (PDC3) controller. The controller 114 outputs control signals that are received by the PTO 110. The PTO 110 can comprise an actuator that operates based upon the control signals received from the controller 114. For example, the controller 114 can utilize reactive control techniques, whereby the controller 114 can cause a motor to affect the displacement between the buoy 102 and the reference 103. In general, the controller 114 can control the PTO 110 to cause the WEC 100 to remain on resonance when off-resonance waves impact the buoy 102, and can cause the WEC 100 to relatively quickly return to resonance when waves impacting the buoy 102 cause the WEC 100 to go off resonance. To that end, the controller 114 can cause the PTO 110 to exert a force 104 on the buoy 102, wherein the exerted force is in the direction of the heave force exerted on the WEC 100 by an impinging wave. In another example, the controller 114 can cause the PTO 110 to exert a force 104 on the buoy 102 in an opposite direction of heave force exerted on the WEC 100 by an impinging wave.

The controller 114 can take into consideration signals from one or more sensors when controlling operation of the PTO 110. For instance, a sensor 116 can output a signal that is indicative of at least one operating parameter of the PTO 110. Such operating parameter may be, for example, an amount of electrical energy being generated by the PTO 110, positions of mechanical elements in the PTO 110, an amount of force 104 being exerted by the PTO 110 on the buoy 102, etc. The sensor 116 can further provide a signal to the controller 114 indicative of a condition of the WEC 100 relative to its environment. For instance, the sensor 116 can be configured to output positional information that indicates a position of the buoy 102 relative to a reference, such as the ocean floor-mooring 103 or a spar. The controller 114 can be configured to control operation of the PTO 110 based at least in part upon a signal output by the sensor 116. Therefore, the controller 114 can receive a signal from the sensor 116 and control operation of the PTO 110 and, therefore, the control force 104 applied to the buoy 102 based upon the signal. Accordingly, the controller 114 can be implemented as a feedback controller. Design of the controller 114 is now described.

Decomposition of the WEC Control Problem

The following description assumes a linear hydrodynamic model for the WEC. A simulator used for testing the WEC model also assumes a linear hydrodynamic model. For a heaving buoy, the Cummins' equation of motion is:

$$(m+\tilde{a}(\infty))\ddot{z}+\int_0^\infty h_r(\tau)\dot{z}(t-\tau)d\tau+kz=f_e+u \quad (1)$$

where m is the buoy mass, $\tilde{a}(\infty)$ is the added mass at infinite frequency, z is the heave position of the buoy's center-of-mass with respect to the mean water level, k is the hydrostatic stiffness due to buoyancy, u is the control force, $f_e$ is the excitation force, and $h_r$ is the radiation force term (radiation kernel). See W. Cummins, *The Impulse Response Function and Ship Motions*, (David W. Taylor Model Basin), Navy Department, David Taylor Model Basin (1962). The second term in Eq. (1) is affected by the present as well as past oscillations.

Consider the simple case of a regular wave where the excitation force has only one frequency ($\omega_1$); in such case it is possible to show that the radiation term can be quantified using an added mass and a radiation damping term, each being considered constant at frequency $\omega_1$ only. See J. N. Newman, *Marine Hydrodynamics*, The MIT Press, USA (1977). The equation of motion for this simple case becomes:

$$(m+\tilde{a}_1)\ddot{z}_1+c_1\dot{z}_1+kz_1=f_{e1}+u_1 \quad (2)$$

where $\tilde{a}_1$ and $c_1$ are constants for a given exciting frequency. The excitation force in this case is:

$$f_{e1}=A_{e1}\sin(\omega_1 t+\phi_1) \quad (3)$$

Figure 2:
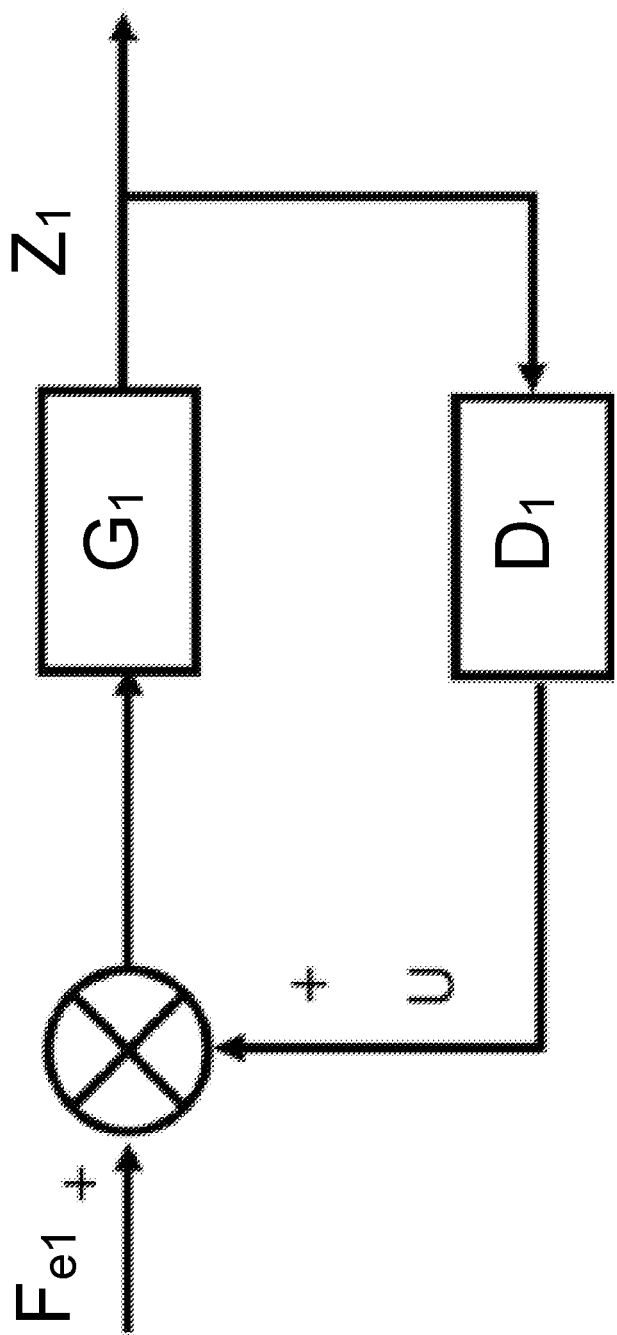
FIG. 2 is a block diagram of a WEC control system of a single frequency regular wave.

If no control is assumed, the system input-output transfer function in the Laplace domain becomes:

$$G_1(s) \equiv \frac{Z_1(s)}{F_{e1}(s)} = \frac{1}{(m+\tilde{a}_1)s^2+c_1 s+k} \quad (4)$$

where $Z_1(s)$ and $F_{e1}(s)$ are the Laplace transforms of $z_1(t)$ and $f_{e1}(t)$, respectively. Using this transfer function, a feedback control can be added that uses measurements of the buoy's velocity (or position as a function of time). Letting the controller transfer function in the Laplace domain be $D_1(s)$, the block diagram for this WEC control system can be constructed as shown in FIG. 2. Let $H_1(s)$ be the closed loop system transfer function in the Laplace domain; hence $$H_1(s) \equiv \frac{Z_1(s)}{F_{e1}(s)} = \frac{G_1(s)}{1-D_1(s)G_1(s)} \quad (5)$$

Now consider the case of wave motion of varying amplitude and frequency. The exciting force $f_e$ for a practical converter in a realistic wave is band-limited (approaching zero at high frequencies), and can be assumed as a linear superposition of N different exciting forces at N different frequencies, that is:

$$f_e = \sum_{i=1}^N f_{ei} = \sum_{i=1}^N A_{ei}\sin(\omega_i t+\phi_i) \quad (6)$$

See J. N. Newman, *Marine Hydrodynamics*, The MIT Press, USA (1977); and R. N. Bracewell, *The Fourier Transform and its Applications*, 3rd edition, McGraw-Hill Science/Engineering, USA (1999). In the case of a real wave, there will be N transfer functions $G_i(s)$ because each frequency has its own value of $c_i$ and $\tilde{a}_i$. In other words, the system reacts differently to different input frequencies, and hence a different transfer function is needed for each input frequency. This can be represented by the block diagram shown in FIG. 3. The resultant buoy motion will be the combined motion of the individually computed motions; that is the buoy position z(t) is the summation of all individually computed positions $z_i(t)$.

Implicit in this treatment is the assumption that each block $G_i$-$D_i$ responds to the particular frequency $\omega_i$ only. That is, the overall converter response is modeled as a linear superposition of multiple blocks $G_i(s)\delta(s,\omega_i)$, where $\delta(s,\omega_i)$ represents the Dirac delta function centered at $\omega_i$. In the limit as N→∞, one expects that such a superposition would provide a close approximation to the true converter response. See R. N. Bracewell, *The Fourier Transform and its Applications,* 3rd edition, McGraw-Hill Science/Engineering, USA (1999).

Figure 3:
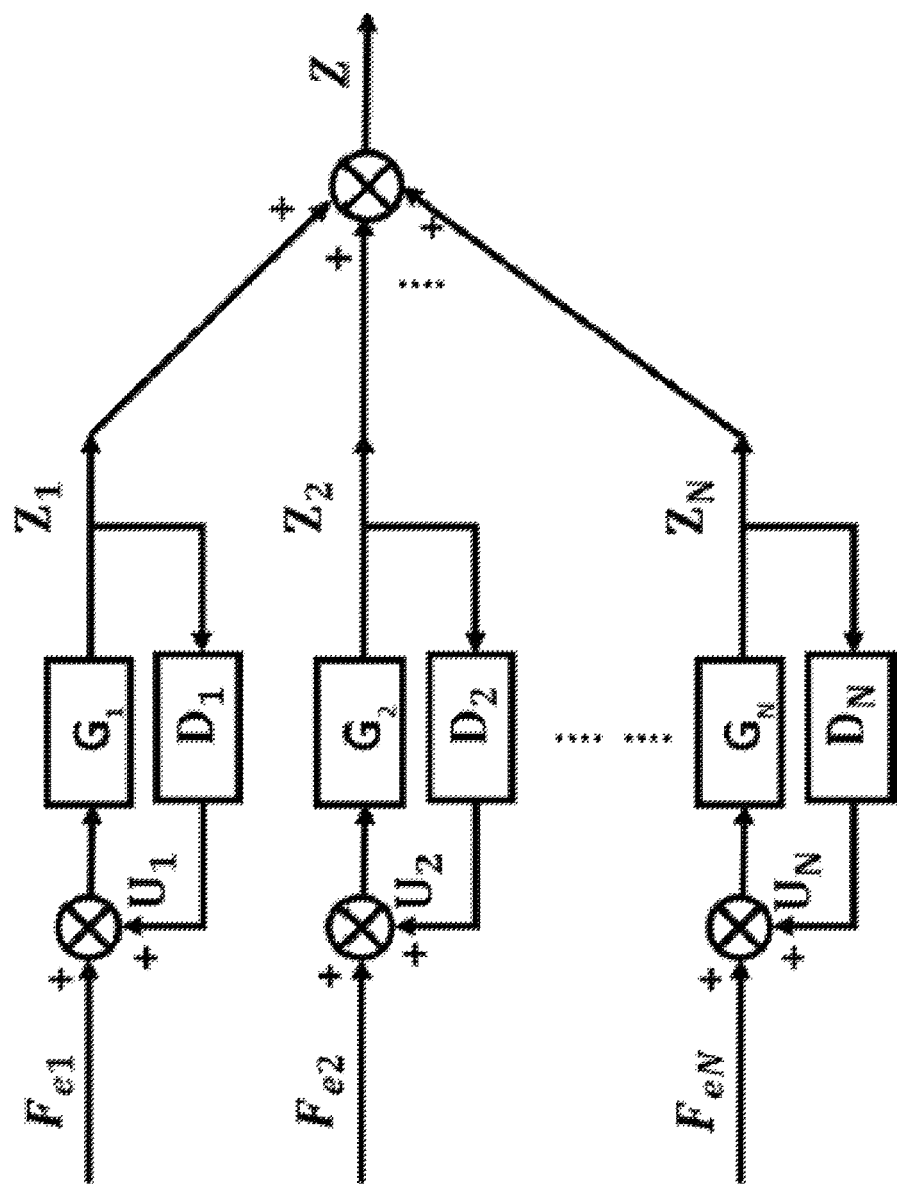
FIG. 3 is a block diagram of the decomposed WEC control system.
Figure 4:
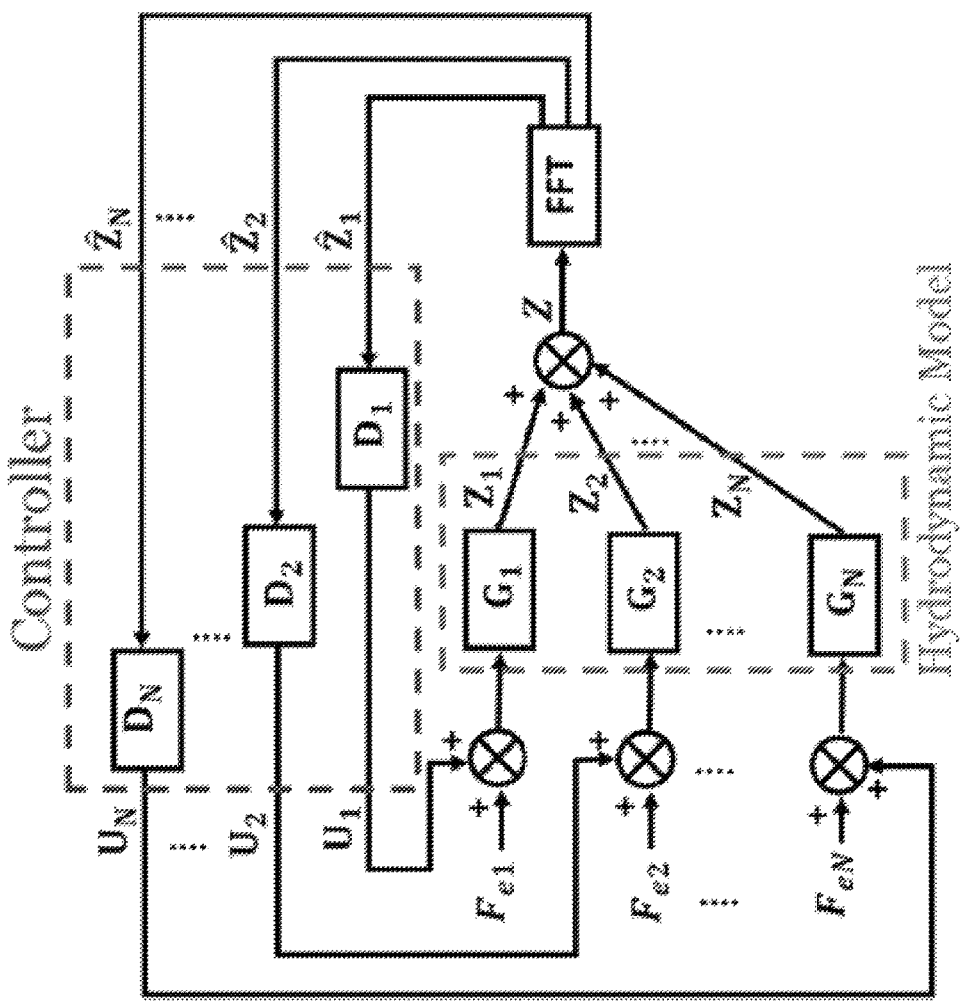
FIG. 4 is a block diagram of the WEC multi-resonant control system.

FIG. 3 shows a control strategy that comprises a separate controller for each frequency in the spectrum. This strategy can be implemented if it is possible to measure (or estimate) the position and velocity components associated with each frequency. This can be achieved using a Fast Fourier Transform (FFT) approach and proportional-derivative complex conjugate control (PDC3), as described below in the sections titled Feedback Signal Processing and Implementation of the PDC3. For now, it is assumed that it is possible to extract the individual positions $z_i(t)$ given the buoy position z(t) and the individual velocities $\dot{z}_i(t)$ given the buoy velocity $\dot{z}(t)$. Then the system block diagram can be presented as shown in FIG. 4. In this figure, the individual transfer functions $G_i$ represent the system's hydrodynamics and are all gathered in one dotted box labeled "Hydrodynamic Model"; similarly, all the individual controllers a are gathered in a dotted box labeled "Controller".

In implementing this controller, the summation of all the individual controllers is computed and it is the control that gets applied to the system. Hence:

$$U(s) = \sum_{i=1}^{N} U_1(s) = \sum_{i=1}^{N} D_1(s)Z_1(s) \quad (7)$$

Figure 5:
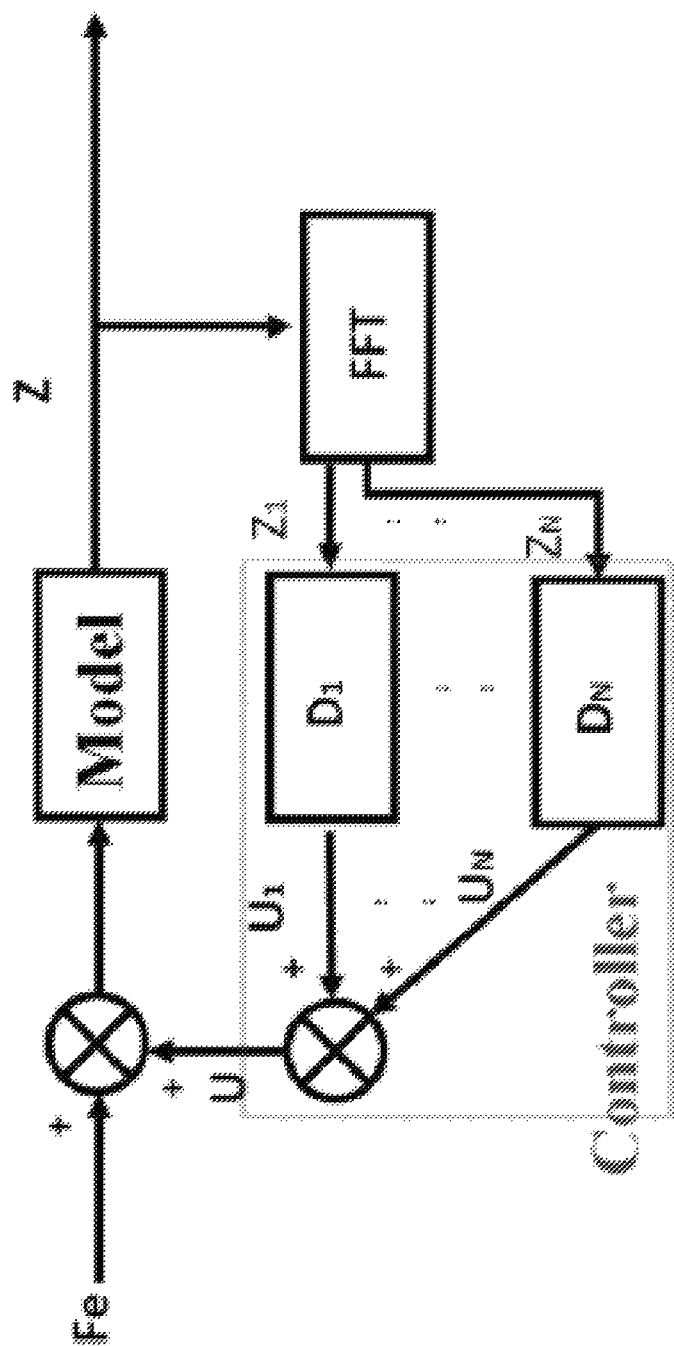
FIG. 5 is a block diagram of the feedback WEC control system of the present invention.

All of the individual excitation forces $F_{ei}$ can be combined in the total excitation force $F_e$, and the resulting block diagram for the system becomes as shown in FIG. 5. In this figure, the system hydrodynamic transfer functions G are gathered in the block labeled "Model".

The WEC control problem is to design the controller D(s); the design goal is to maximize the energy harvested. In summary, the WEC control problem is decomposed into N control sub-problems, as illustrated in FIG. 3. In this case, N different controls, $D_i(s)$, are designed. Using a proportional-derivative control, two control gains are to be designed for each individual controller $D_i$. One advantage of this approach is that the input is a single-frequency for each sub-problem and hence eliminating the need to evaluate a convolution integral. The other advantage is that each controller $D_i$ can be optimized to its input frequency, independently from other controllers.

Proportional-Derivative Approximation for C3

The theoretical maximum power capture with viscous losses is represented by complex conjugate control (C3). The control approach described above can be used to approximate C3. In C3, the WEC velocity is in phase with the excitation force and the control impedance is equal to the complex conjugate of the mechanical impedance. This section considers an implementation based on N Proportional-Derivative (PD) controllers, wherein each controller is tuned according to its individual exciting force frequency. Proportional-Integral-Derivative (PID) control has been used for WEC control by Nielsen et al. and Valerio et al. See S. R. Nielsen et al., *Ocean Eng.* 72, 176 (2013); and D. Valerio et al., "Comparison of control strategies performance for a wave energy converter," 2008 16th *Mediterranean Conference on Control and Automation,* pp. 773-778 (2008). Note that in practice this implementation will be achieved using a combination of actuators and power amplifiers that further control the buoy motion. The proportional and derivative gains, $k_{pi}$ and $k_{di}$, are representative of the combined effect of the hardware and the software settings.

For each of the control sub-problems described above, the PD controller has the form:

$$D_1(s) = -k_{p1} - k_{d1}s \quad (8)$$

The dynamic system for this sub-problem can then be written as:

$$(m+\tilde{a}_1)\ddot{z}_1 + c_1\dot{z}_1 + kz_1 = f_{e1} - k_{p1}z_1 - k_{d1}\dot{z}_1 \quad (9)$$

$$\therefore (m+\tilde{a}_1)\ddot{z}_1 + (c_1+k_{d1})\dot{z}_1 + (k+k_{p1})z_1 = f_{e1} \equiv A_{ei}\sin(\omega_1 t + \phi_1) \quad (10)$$

For the system described in Eq. (10), the velocity $\dot{z}(t)$ will be in resonance with the excitation force $f_{ei}$ if the following condition is satisfied:

$$\omega_{n1} \equiv \sqrt{\frac{k+k_{p1}}{m+\tilde{a}_1}} = \omega_1 \quad (11)$$

Let $\overline{m}_i = m + \tilde{a}_i$, then the proportional gain is:

$$k_{p1} = \omega_1^2 * \overline{m}_1 - k \quad (12)$$

For maximum useful energy, the complex conjugate control implies that the real part of the control impedance is equal to the real part of the mechanical impedance; hence the derivative control gain is selected to be:

$$k_{d1} = c_1 \quad (13)$$

See G. Bacelli, *Optimal Control of Wave Energy Converters* (Ph.D. thesis), National University of Ireland, Maynooth, Ireland (2014).

The above control is herein referred to as PD Complex Conjugate Control (PDC3). It is possible to show analytically that the PDC3 is equivalent to the C3 as follows. Consider a regular wave with a single frequency, for which the buoy equation of motion is given in Eq. (2). The C3, $U_{c31}$, is defined as:

$$u_{c31} = (m+\tilde{a}_1)\ddot{z}_1 + kz_1 - c_1\dot{z}_1 \quad (14)$$

Substituting the excitation force $f_{e1} = A_{e1}\sin(\omega_1 t)$) and the control $u_{c31}$ into the equation of motion (Eq. (2)), then the solution of Eq. (2) becomes:

$$\dot{z}_1 = \frac{A_{e1}}{2c_1}\sin(\omega_1 t) \quad (15)$$

$$\therefore z_1 = \frac{-A_{e1}}{2c_1\omega_1}\cos(\omega_1 t) \quad (16)$$

Substituting Eqs. (15) and (16) into Eq. (14), the following is obtained:

$$u_{c31} = (m + \tilde{a}_1) \frac{A_{e1} \omega_1}{2c_1} \cos(\omega_1 t) + k \frac{-A_{e1}}{2c_1 \omega_1} \cos(\omega_1 t) - \quad (17)$$

$$c_1 \frac{A_{e1}}{2c_1} \sin(\omega_1 t)$$

$$= \frac{A_{e1}}{2c_1} \cos(\omega_1 t) \left( \omega_1 (m + \tilde{a}_1) - \frac{k}{\omega_1} \right) - \frac{A_{e1}}{2} \sin(\omega_1 t)$$

The PDC3 control, $u_{PDC31}$, is defined in Eq. (8). Substituting Eqs. (15) and (16) into Eq. (8), the following is obtained:

$$u_{PDC31} = k_{p1} \frac{A_{e1}}{2c_1 \omega_1} \cos(\omega_1 t) - k_{d1} \frac{A_{e1}}{2c_1} \sin(\omega_1 t) \quad (18)$$

Comparing the terms in both $u_{PDC31}$ and $U_{C31}$ (Eqs. (17) and (18)), the following is obtained:

$$\frac{k_{p1}}{\omega_1} = \left( \omega_1(m + \tilde{a}_1) - \frac{k}{\omega_1} \right) \Rightarrow k_{p1} = \omega_1^2(m + \tilde{a}_1) - k \quad (19)$$

$$k_{d1} = c_1 \quad (20)$$

Eqs. (19) and (20) are identical to the $k_{p1}$ and $k_{d1}$ expressions computed in Eqs. (12) and (13), which confirms that both controllers would generate the same motion described by Eqs. (15) and (16) and hence both controllers are equivalent. Generalizing this analysis from a single frequency case to a multi-frequency case is straightforward.

To completely design the PDC3 controller, it is required to know the stiffness coefficient k, the added mass $\tilde{a}_i$, the damping coefficients $c_i$, and the frequencies of the excitation force $\omega_i$, $\forall_i$. The frequencies of the excitation force are unknown. However, the steady state response of a system to a sinusoidal input has the same frequency as the input frequency. See K. Ogata, *Modern Control Engineering*, 4th edition, Prentice Hall PTR, Upper Saddle River, N.J., USA (2001). Hence, both $z_i$ in the steady state and $f_{ei}$ have the same frequency. In the present feedback control system, the buoy response z(t) is measured. By extracting the frequencies in z(t), one can determine the frequencies of the excitation force and use them to update the controller gains in near-real time (Fourier transformation uses data from the past and has no predictive element. It can be assumed that the frequency-phase-amplitude combination is slowly varying, hence the near-real time update of the controller gains.)

A Fast Fourier Transform (FFT) function can be used to extract the frequencies of z(t). The accuracy of the obtained frequencies, amplitudes, and phases need to be controlled to guarantee good performance for the proposed PDC3 control. Below is described a FFT implementation. Any other signal processing approach capable of extracting the frequencies can be used for the same purpose, such as Kalman filters, least-square estimators, etc.

Stability of the Proportional-Derivative Control

This section addresses the stability of the PDC3 control. Consider the block diagram in FIG. 4. There are N controls $D_i=1 \ldots N$. Each controller $D_i$ is basically a feedback control for the system $G_i$. From the block diagram in this figure, it can be seen that if all the subsystems ($G_i$ and $D_i$, $\forall_{i=1 \ldots N}$) are stable, then the overall system is stable. In other words, if the output from each subsystem is bounded, then the linear summation of all the outputs is also bounded. Hence, the stability problem of the system reduces to finding the stability conditions for the subsystem ($G_i$ and $D_i$) for arbitrary i.

The subsystem open loop transfer function $G_i$ is a second order transfer function as shown in Eq. (2). The PD controller is defined in Eq. (8). The closed loop system equation of motion is given in Eq. (10), for which the characteristic equation is:

$$((m+\tilde{a}_1)s^2+(c_1+k_{d1})s+(k+k_{p1}))Z_1(s)=0 \quad (21)$$

A Routh stability analysis for the system given in Eq. (21) indicates that this system is stable if $k+k_{pi}>0$ and $c_i+k_{di}>0$. From Eq. (12), the following is obtained:

$$k+k_{pi}=\omega_i^2 \overline{m}_1>0 \quad (22)$$

Also, Eq. (13) shows that $k_{di}=c_i$, which is always a positive damping coefficient. Therefore, for the PDC3 of the present invention, any arbitrary subsystem is stable and hence the overall system is stable. The above stability analysis does not take into consideration model uncertainties.

Consider a continuous disturbance force on the buoy. In FIG. 2, a disturbance on the buoy would not be different from the wave excitation force, from the buoy prospective. In other words, the PDC3 controller can take advantage of any external force to further increase the energy absorption in the same way the controller reacts to the excitation force. A disturbance force affects the buoy motion z and the frequencies of the buoy motion are extracted whether they are caused by wave excitation force or disturbance force or both. The PDC3 controller will then try to resonate with these frequencies to maximize the energy absorption.

Feedback Signal Processing

When tested on a numerical WEC case study for a regular wave, the FFT function did not produce accurate predictions for the amplitudes and phases that comprise the buoy position signal, even when assuming perfect measurements for the buoy position. One reason for this inaccuracy is the leakage error which is the error in amplitude and frequency that occurs due to the non-periodicity of the measured signal in the sample interval. Leakage is probably the most common and most serious digital signal processing error. Time weighting functions, called windows, are usually used to better satisfy the periodicity requirement of FFT. See O. M. Solomon, *IEEE Trans. Instrum. Meas.* 43(2), 194 (1994); and G. Andria et al., *Measurement* 12(1), 25 (1993). These windows weight heavily the beginning and end of the sample to zero, while the middle of the sample is heavily weighted towards unity. There are a variety of windows; the Hanning window is used herein. The Hanning window is a cosine bell shaped weighting; this window type can have amplitude errors but it is most useful for searching operations where good frequency resolution is needed. See S. R. Chintakindi et al., "Improved Hanning window based interpolated fft for power harmonic analysis," *TENCON 2015-2015 IEEE Region 10 Conference*, pp. 1-5 (2015). The sample data period size should be selected so as to reduce the errors. There is a tradeoff between a smaller sample data period size, which may result in only frequencies of the window function, and a larger sample data period size, which may not track the change of buoy's oscillation. See T. R. F. Mendona et al., "Variable window length applied to a modified Hanning filter for optimal amplitude estimation of power systems signals," *2015 IEEE Power Energy Society General Meeting*, pp. 1-5 (2015). An important step is to find a good size for the sample period. A period of a 6T to 8T (T is the period of incoming wave) is selected as suggested in Li and Chen and also based on several simulations. See Y. F. Li and K. F. Chen, *Comput. Phys. Commun.* 178(7), 486 (2008). The sampling rate used in FFT is 100 Hz.

To further reduce the error in the obtained amplitudes and phases, an optimization step can be carried out before applying the control. The optimization objective is to minimize the error between the measured position and velocity signals and the predicted position and velocity signals from the FFT. The optimization variables are the amplitudes and phases. Let $\hat{\omega}_i$, $\hat{\phi}_i$, and $\hat{\zeta}_i$ be the estimated frequencies, phases, and amplitudes, respectively, $\forall_{i=1 \ldots N}$, then:

$$\hat{z} = \sum_{i=1}^{N} \hat{\zeta}_1 \cos(\hat{\omega}_1 t + \hat{\phi}_1) \qquad (23)$$

and $$\dot{\hat{z}} = \sum_{i=1}^{N} -\hat{\omega}_1 \hat{\zeta}_1 \sin(\hat{\omega}_1 t + \hat{\phi}_1) \qquad (24)$$

The optimization objective function can be written as:

$$J = \frac{w_1}{w_1 + w_2}(z - \hat{z})^2 + \frac{w_2}{w_1 + w_2}(\dot{z} - \dot{\hat{z}})^2 \qquad (25)$$

where $w_1$ and $w_2$ are weight factors. The ranges for the amplitudes are assumed herein as:

$$0.98 \leq \frac{\zeta_{1opt}}{\hat{\zeta}_1} \leq 1.1 \qquad (26)$$

where $\zeta_{iopt}$ is the optimal amplitude. Also, a range is assumed for the phase as:

$$-\frac{\pi}{8} \leq \phi_{1opt} - \hat{\phi}_1 \leq \frac{\pi}{8} \qquad (27)$$

where $\phi_{iopt}$ is the optimal phase. So, for estimated values of $\hat{\zeta}_i$ and $\hat{\phi}_i$, ranges for these two variables are set according to Eqs. (26) and (27).

Implementation of the PDC3

The section above titled Decomposition the WEC Control Problem explained the concept of decomposing the WEC control problem and the section titled Proportional-Derivative Approximation for C3 described how to use that concept in developing a feedback control strategy that produces a complex conjugate control. This section describes how this feedback control strategy is implemented. The control strategy of the invention is an adaptive feedback controller which utilizes only the measured buoy position and velocity; there is no data required about the excitation force or the waves. Hence, the excitation force is not decomposed into its components as might be inferred from FIG. 3. That figure only explains the concept of exploiting the linearity (and principle of superposition) of the system to generate the proposed control. The PDC3 control implementation block diagram is shown in FIG. 5. As shown in this figure, the system output is decomposed into its components and the individual controls are computed. These individual components are then added up to get the computed control force that is actually applied to the system.

However, the block diagram shown in FIG. 3 can also be implemented if the excitation force is well known. This can be used in simulations—as another implementation—to verify the accuracy of the FFT processing used in the PDC3. When assuming the excitation force is well known, the control will be referred to herein as "PDC3 Theoretical". In this "PDC3 Theoretical" implementation, the excitation force frequencies are known; each component of the excitation force is propagated using its own $G_i(s)$; no FFT step is needed since the frequencies are known and the amplitudes of the position and velocities are directly read from the individual propagators. The "PDC3 Theoretical" is considered as an upper limit for the PDC3.

In implementing the PDC3, it is assumed that there are only four frequencies for the controller; that is N=4 in the controller. This number is chosen as some studies have shown that three to four frequencies usually capture most of the energy in most wave spectra. See B. A. Ling, "Real-time Estimation and Prediction of Wave Excitation Forces for Wave Energy Control Applications," MS Thesis, Oregon State University, June (2015). The number of controller frequencies, however, is a parameter that can be selected at the beginning of the simulation; it can be tuned. In the simpler simulation cases where it is assumed that the input excitation force has only three frequencies, then it is assumed that the controller has only three frequencies; for the Bretshneider wave it is assumed that the controller has four frequencies. As the wave conditions change, the controller will always look for the four frequencies with highest amplitudes (most significant). Hence if a frequency is added and it is among the top four frequencies in terms of the amplitudes then it will be captured. Similarly, if a frequency disappears, the next frequency will be captured instead of the disappeared one. Once the frequencies are captured, the controller gains are updated based on the new captured frequencies.

Numerical Results

A spherical buoy is assumed of radius 1 m. The equilibrium level is such that half of the sphere is submerged. The mass of the sphere in this case is $2.0944 \times 10^3$ kg. The corresponding added mass at infinite frequency is $1.1253 \times 10^3$ kg. A regular excitation force is assumed with a frequency of $2\pi/3$.

Two implementations for the PDC3 are described below. The first implementation assumes perfect knowledge of the excitation force and its frequencies, amplitudes, and phases (herein referred to as PDC3 Theoretical). The second implements FFT with window and optimization, as described above in the section titled Feedback Signal Processing, to extract the frequencies, amplitudes, and phases of the measured buoy position, assuming that no knowledge is available about the excitation force nor the wave (this implementation, referred to as PDC3, is the method of the present invention). Both implementations are compared to the complex conjugate control.

Figure 6A:
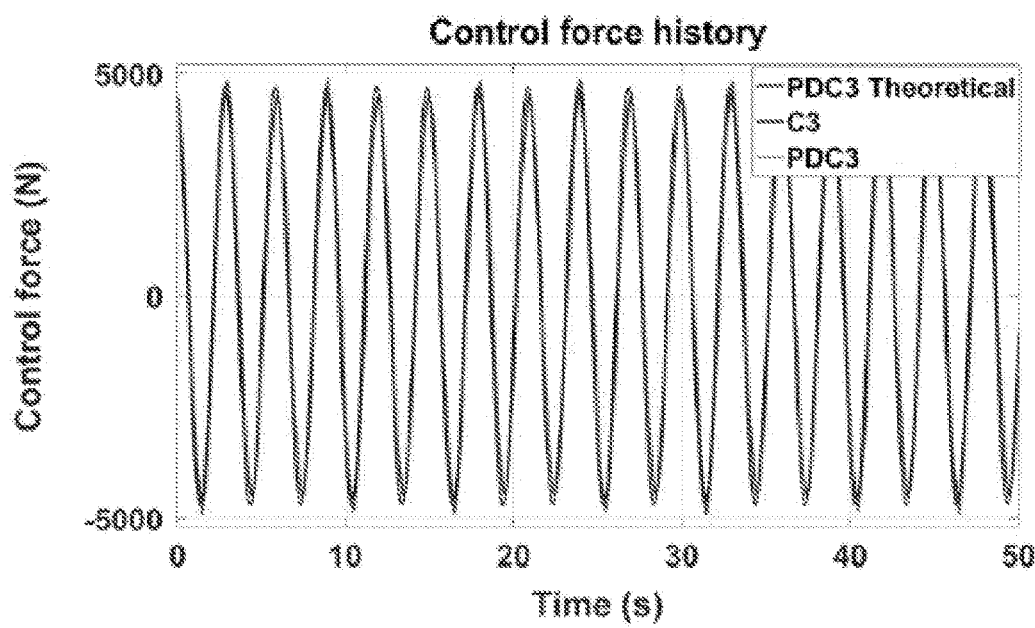
FIGS. 6A and 6B show simulations for both actual and theoretical proportional-derivative complex conjugate control (PDC3) of the control force and the extracted energy, respectively.
Figure 6B:
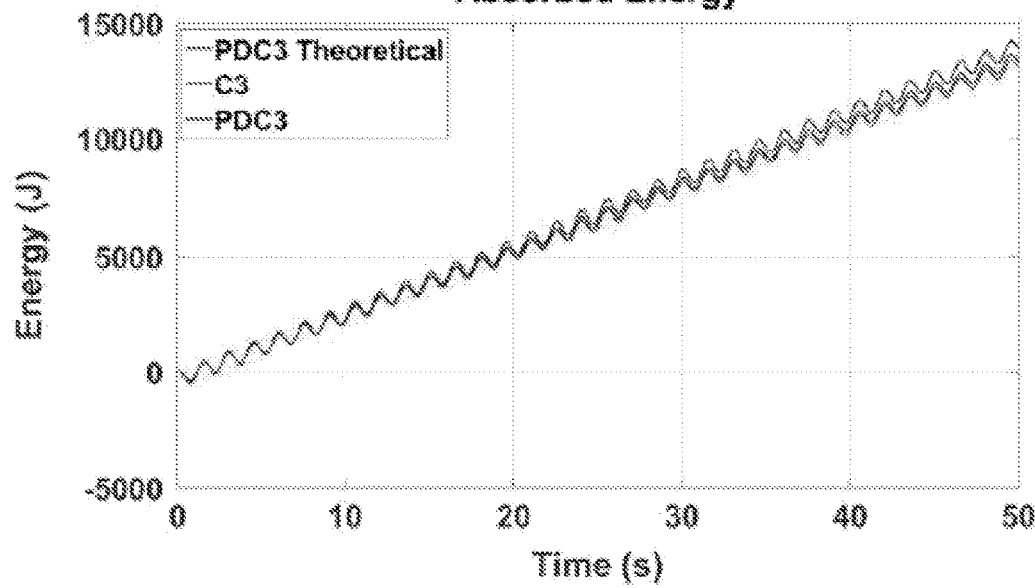

FIG. 6A shows the simulated control for both the PDC3 and the PDC3 Theoretical as well as the C3. Both PDC3 and PDC3 Theoretical are almost identical which indicates that the FFT processing resulted in an accurate estimation for the frequencies, amplitudes, and phases. Both controls are also very close to the C3. The corresponding extracted energies are shown in FIG. 6B for the PDC3, the PDC3 Theoretical, and the C3. The energy from PDC3 is almost identical to the energy from the PDC3 Theoretical, while both are slightly off from the C3 energy. The position and velocity of the buoy for this case are shown in FIGS. 7A and 7B, respectively. Shown also in FIG. 7B is the scaled excitation force to emphasize that the resulting control puts the buoy velocity in phase with the excitation force as predicted by the C3.

The same device was simulated assuming an incident wave with three frequencies. The wave periods are 1.5, 2, and 3 s. The corresponding amplitudes of this wave are 0.05, 0.05, and 0.1 m, respectively. These values generate a small motion for which the linear model remains valid. FIGS. 8A and 8B show the energy using the PDC3 and the Theoretical PDC3 compared to the C3. To emphasize the optimality of the PDC3 approach, a fourth curve is plotted to represent the analytical PDC3. The analytical PDC3 energy is computed based on the analytic formulae for the control and velocity given in Eqs. (18) and (15), respectively. FIG. 8A shows the full history of simulation and FIG. 8B zooms in on the steady state part only. Note that the C3 curve is valid only in the steady state part. Hence, for the sake of comparison with the PDC3, the C3 calculations started only in the steady state part and it is initialized with an energy level equal to that computed using the PDC3 FFT at time t=120 s (beginning of the C3 calculations). It can be seen from FIG. 8B that the analytic PDC3 line almost coincides with the C3 line. The PDC3 Theoretical assumes perfect decomposition of the output signal yet using a numerical integrator for the system differential equations is slightly off. The PDC3 FFT adds another source of error due to the efficiency of the signal decomposition.

Figure 9:
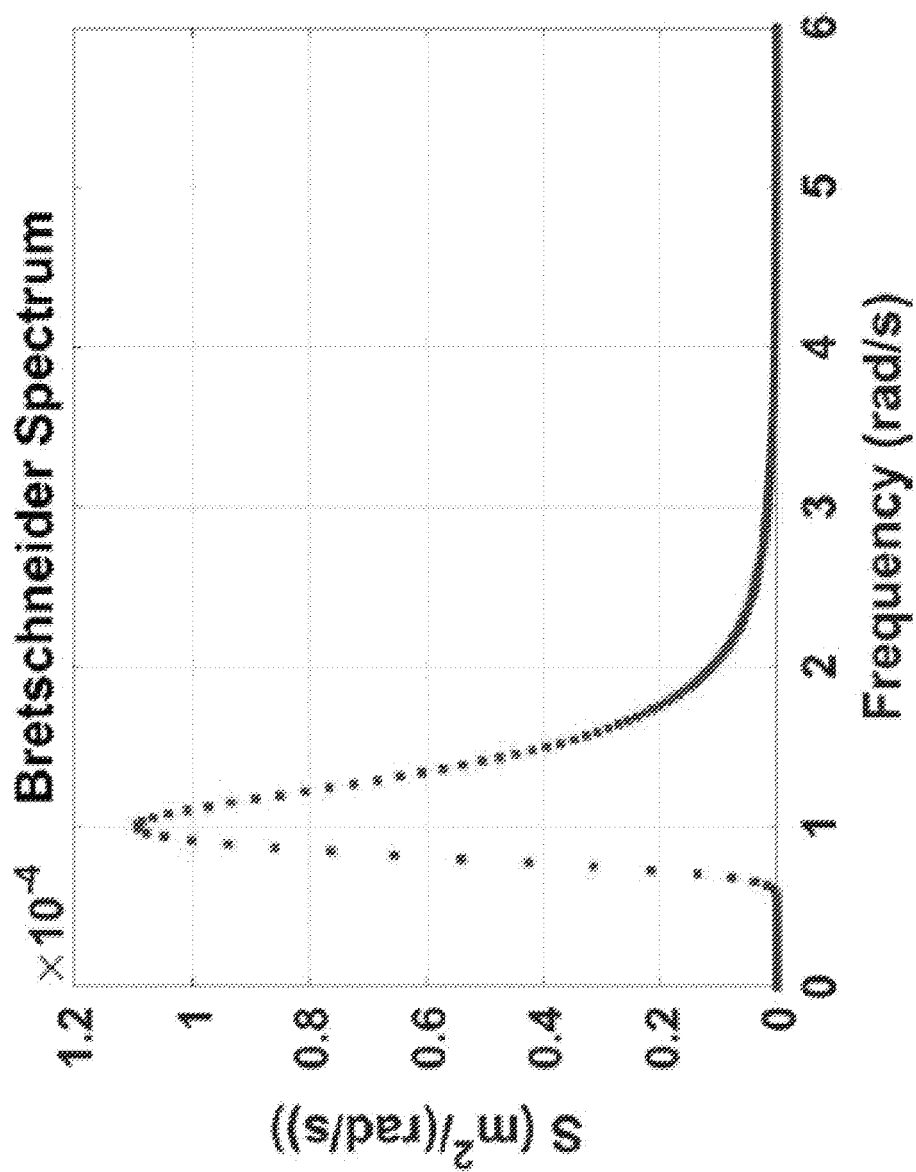
FIG. 9 is a graph of the Bretshneider spectrum.

The same WEC was simulated on a more realistic case where the wave is assumed to have a Bretshneider spectrum, with a significant wave height of 0.035 m and peak period of 6.28319 s. The Bretshneider spectrum wave is sampled at 257 frequencies for simulation, as shown in FIG. 9. NEMOH, a boundary element numerical software tool, was used to generate the excitation force coefficients for the given buoy shape. See A. Babarit and G. Delhommeau, "Theoretical and numerical aspects of the open source BEM solver NEMOH," *Proceedings of the 11th European Wave and Tidal Energy Conference*, Nantes, France (2015); and P. Schmitt et al., *Eur. J. Mech. B/Fluids* 58, 9 (2016). The excitation force is then computed as follows:

$$F_e = \sum_{i=1}^{32} R(f_{ei}\zeta_i e^{i\omega_1 t + \phi_1}) \quad (28)$$

where $F_e$ is the excitation force, $f_{ei}$ is the excitation force coefficient for the frequency $\omega_i$, $\zeta_i$ and $\phi_i$ are the amplitude and phase of frequency $\omega_i$, respectively, and $R(x)$ is the real part of x. This excitation force $F_e$ is then used to simulate the force on the buoy.

Figure 10A:
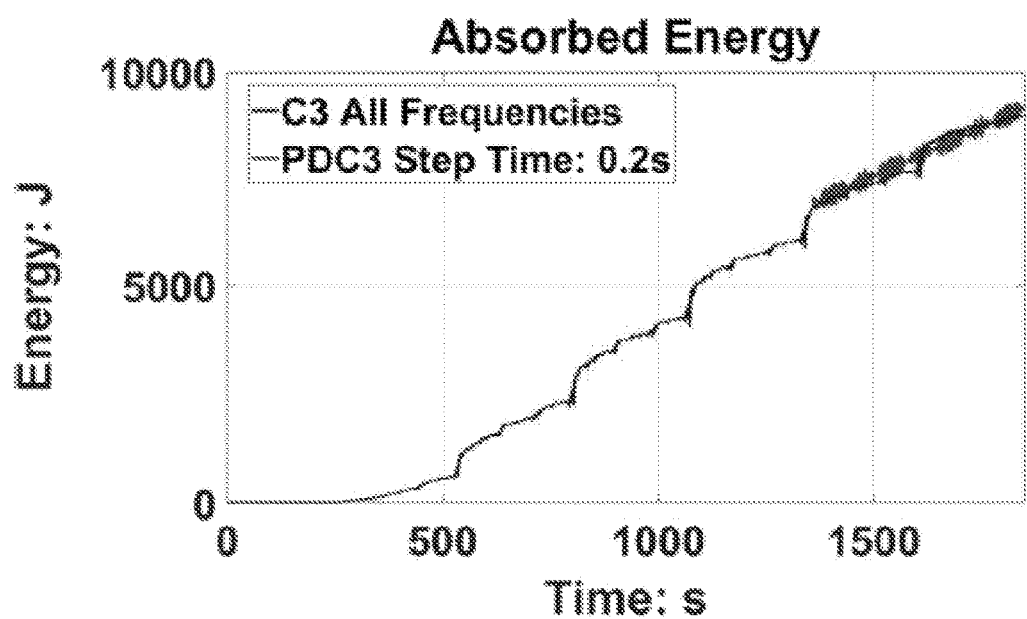
FIGS. 10A and 10B show simulations of Bretshneider wave for PDC3, C3 for four dominant frequencies, and C3 for all frequencies.
Figure 10B:
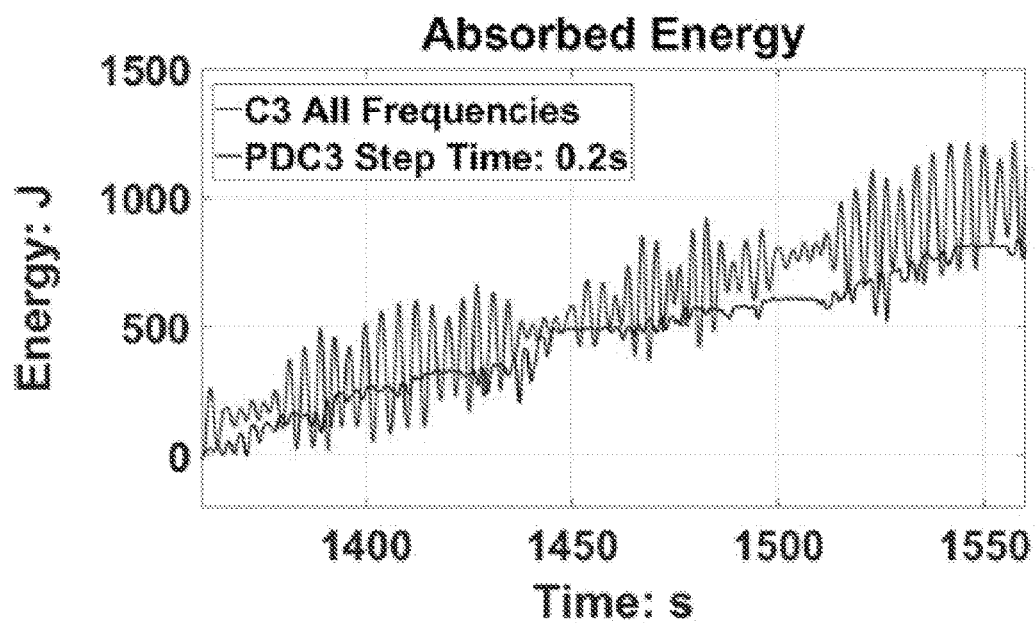

As can be seen from FIGS. 10A and 10B, the PDC3 energy capture is close to that of the C3 solution. The C3 is a steady state solution, so it is implemented only starting at time 1350 s when the PDC3 system has become close to a steady state so that the two solutions can be compared. Also, at the time of 1350 s the energy absorbed of the C3 is reset to the same value as that of the PDC3, for comparison purpose. In this simulation, the control time step of the PDC3 is set to 0.2 s.

Figure 11:
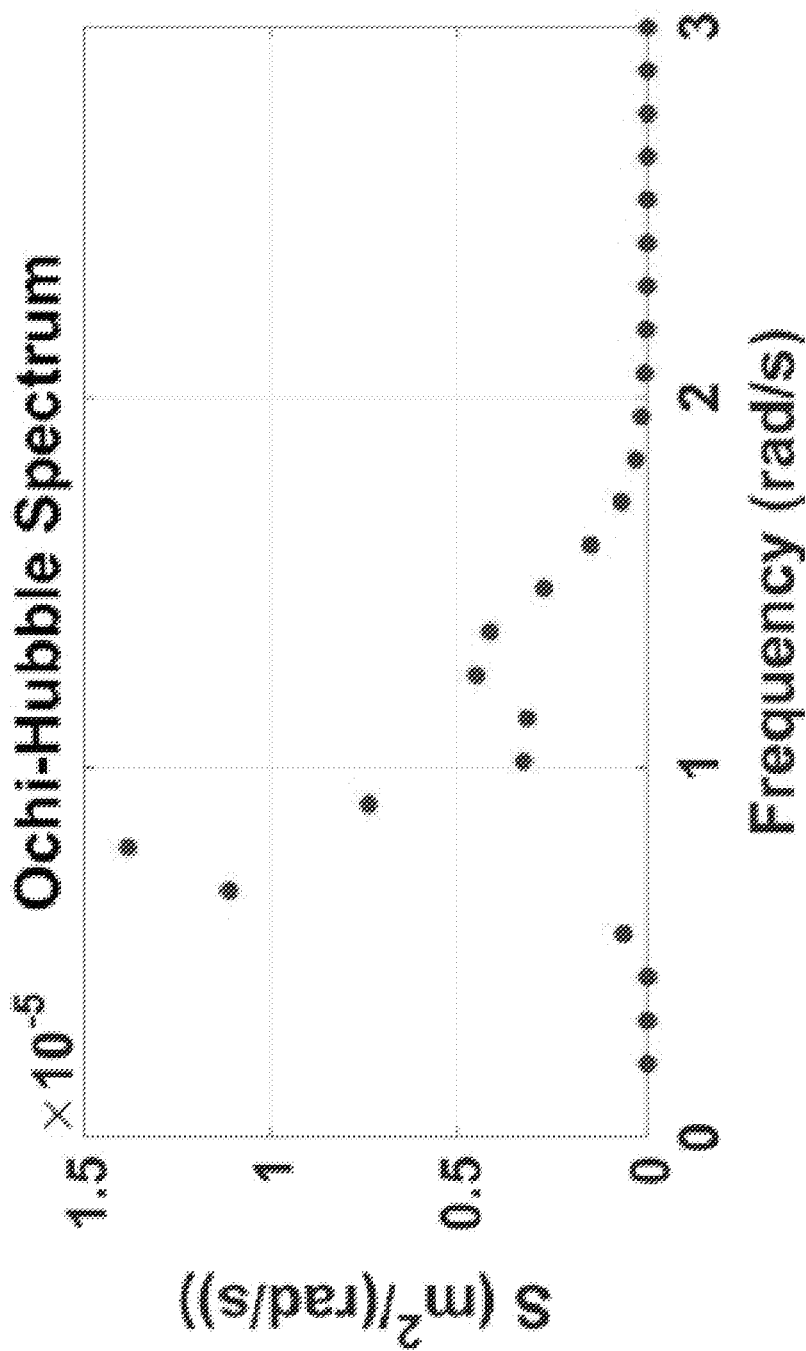
FIG. 11 is a graph of an Ochi-Hubble spectrum.
Figure 12A:
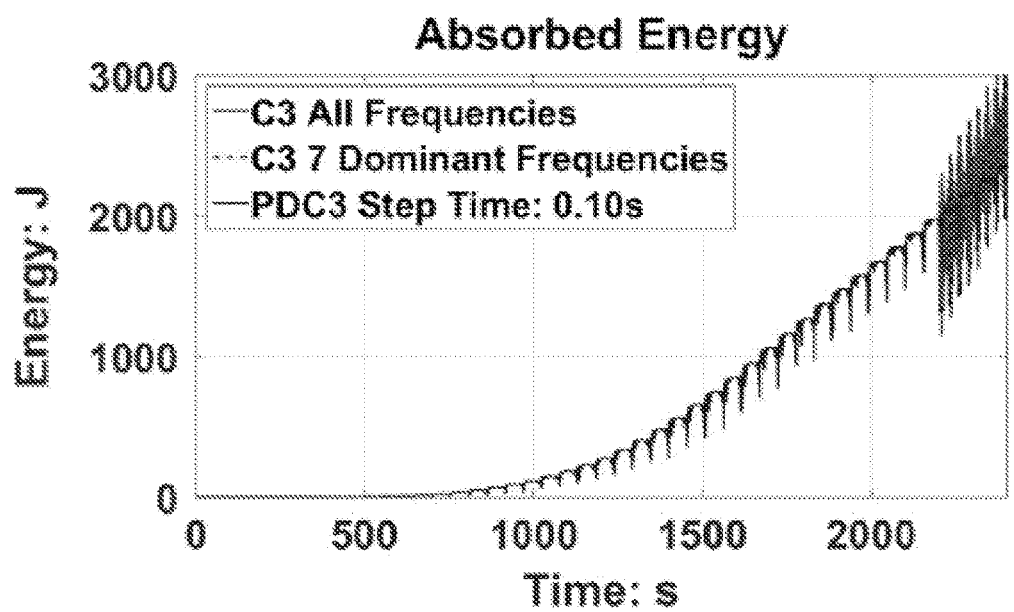
FIGS. 12A and 12B show simulations of Ochi-Hubble wave for PDC3, C3 for seven dominant frequencies, and C3 for all frequencies.
Figure 12B:
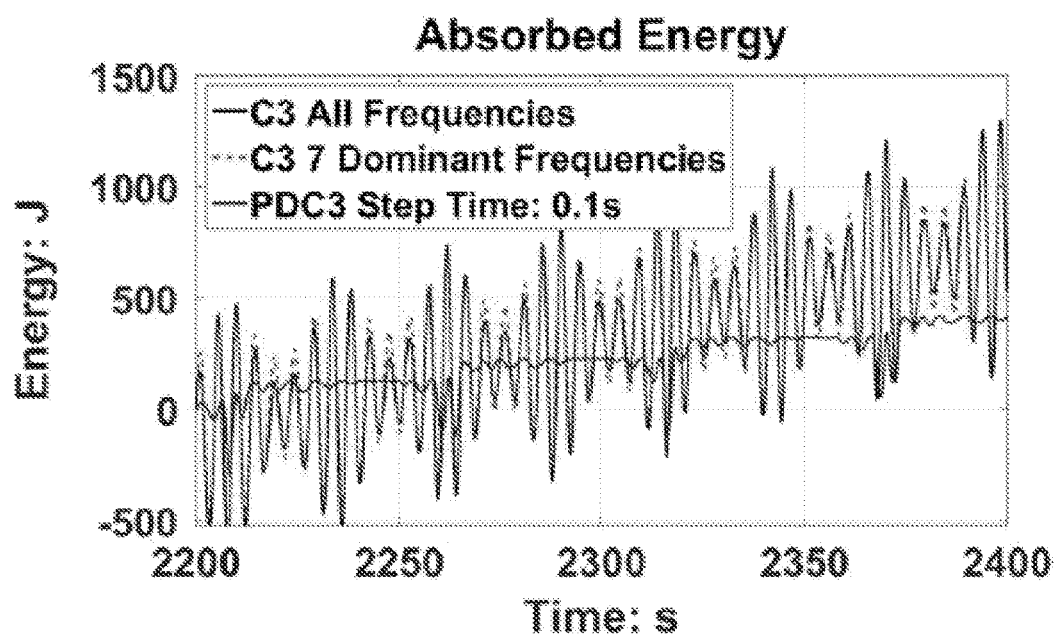
Figure 14A:
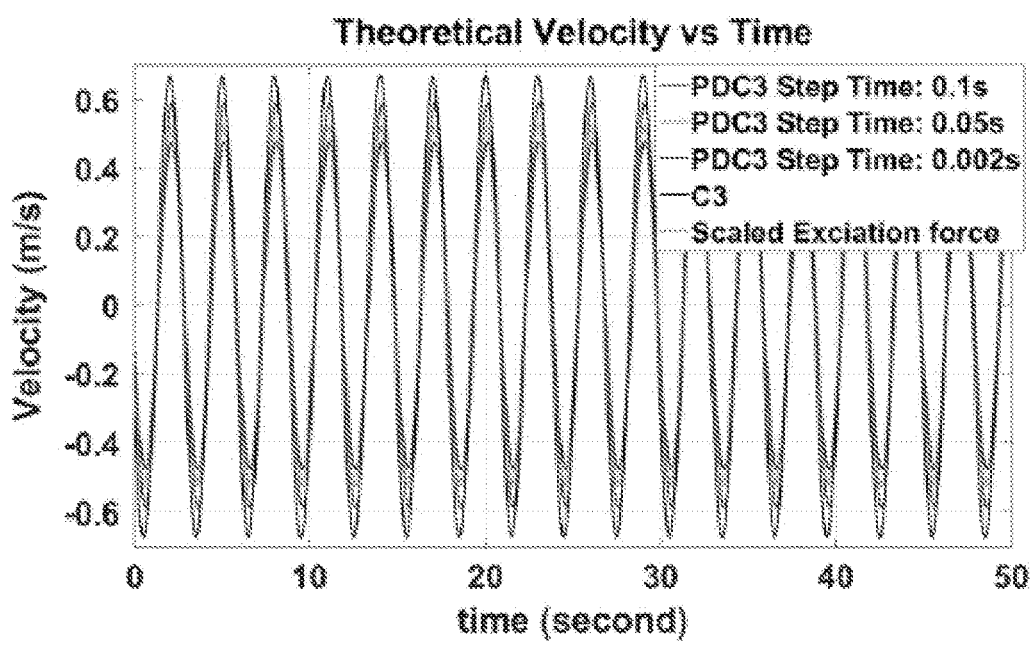
FIGS. 14A and 14B are graphs of buoy position and buoy velocity. As the time step gets smaller the difference between the PDC3 and the C3 gets smaller.
Figure 14B:
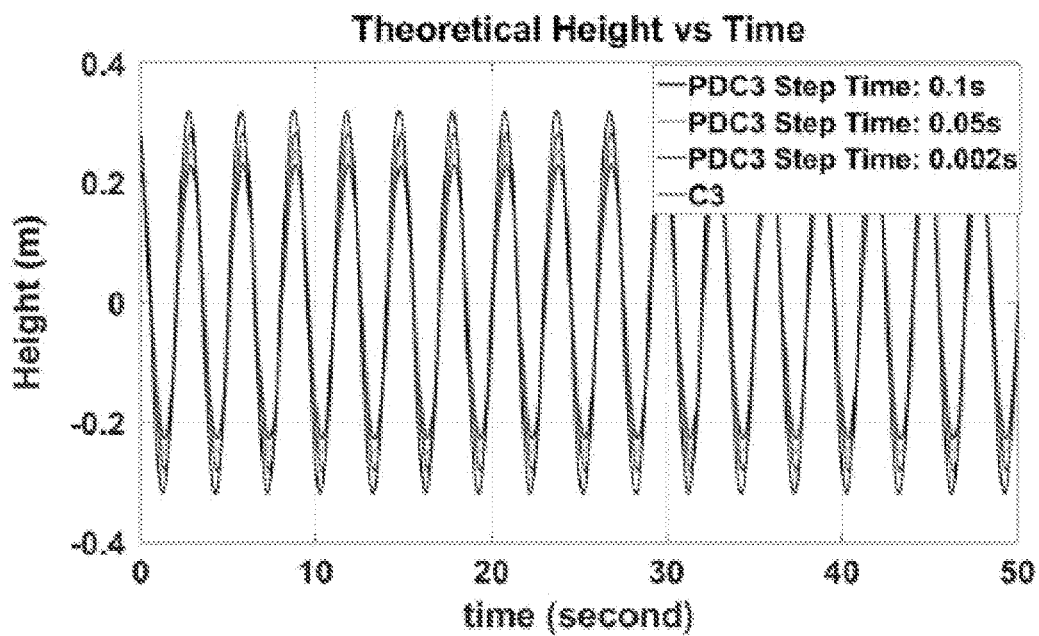

The same WEC was simulated using an Ochi-Hubble wave spectrum, with a significant wave height of 0.01 m and peak period of 6.28319 s. The two peak frequencies of the spectrum are at 0.78 rad/s and 1.3 rad/s. The Ochi-Hubble spectrum wave is sampled at 25 frequencies, picked in the range of 0.2-3 rad/s, as shown in FIG. 11. As can be seen from FIGS. 12A and 12B, the C3 solution using all the frequencies is about the same as the C3 using only seven frequencies. The PDC3 energy capture is close to that of the C3 solution. The C3 is a steady state solution, so it is implemented only starting at time 2200 s when the PDC3 system has become close to a steady state so that the two solutions can be compared. Also, at the time of 2200 s the energy absorbed of the C3 is reset to the same value as that of the PDC3, for comparison purpose. In this simulation, the control time step of the PDC3 is set to 0.1 s.

DISCUSSION

The multi-resonant control method of the present invention can be thought of as a way to approach complex conjugate control using feedback only; up to the accuracy of extracting the frequencies, amplitudes, and phases from the output. One main difference is that the complex conjugate control is a steady state solution while the PDC3 of the present invention works for both steady state and transient response.

For the regular wave, the slight difference in energy extraction between the PDC3 and the C3 can be attributed to numerical errors. Specifically, the PDC3 (and PDC3 Theoretical) is a feedback control where the buoy height and velocity are numerically simulated and used for feedback. Any error in the numerical integration of the differential equations would affect the control and hence the propagation of the states; therefore, this numerical error gradually accumulates over time. This type of numerical error does not affect the C3 since it is not a feedback control; hence the control is computed as a function of time, independent from the state propagation and hence it is free of propagation numerical errors. The analytic PDC3 also does not have numerical integration for the equation of motion. Also, the coefficients $c_i$ are computed via interpolation from a table at the different frequencies that are extracted from the FFT. So, any error due to resolution error in the FFT or in the interpolation will reflect on the corresponding $c_i$ value which directly impacts the $k_{di}$ controller gain in the PDC3 and PDC3 Theoretical. Since the control is used to propagate the states numerically in the PDC3 and PDC3 Theoretical, these errors propagate in time and accumulate; whereas in the C3 the control does not need the numerical propagation of the states. This explains why the difference between the C3 and the PDC3 increases over time. To further show this effect, FIGS. 13A, 13B and 14A, 14B compare the PDC3 and the C3 for three different integration time steps of the PDC3. As can be seen from FIGS. 13A, 13B and 14A, 14B, as the time step gets smaller the difference between the PDC3 and the C3 gets smaller as well.

In the test case when a Bretschneider wave is used, a difference between the PDC3 and C3 solutions can be caused by another reason. The C3 is a steady state solution which means that if the system is not in a steady state the energy absorption estimated by the C3 is not accurate. In the Bretschneider wave case, the frequencies change and the controller tracks these changing frequencies and hence the steady state is likely to be disturbed on a continuous basis.

For panchromatic waves, T is the significant peak period. The spectral envelope is assumed stationary. At the time the control is applied, the controller gains are computed based on data collected over a period of 6T-8T that ends at the current time. The data is used to get an estimate for the excitation force frequencies at the current time only. If the buoy motion frequencies do not change over the 8T period, then the PDC3 is expected to match the C3 solution. However, when the frequencies change during the 8T period, there will be a difference between the PDC3 and the C3. There are two aspects about this case. First, when the frequencies change over the 8T period, the FFT tool may not capture accurate frequencies that match that of the excitation force; and hence this is a source of error. Second, as mentioned above, the C3 solution is a steady state solution which means that when the frequencies change during the 8T period, a transient response is expected and the C3 calculations are not applicable in this case. The PDC3 tries to minimize the impact of this rapid frequency change on the system performance through the square error minimization step. The simulations highlight that there is always a difference between the PDC3 and C3; and one reason for this difference is the rapid frequency change. Again, the C3 solution is not correct in that case.

FIGS. 8A and 8B present the comparison between the C3 and the PDC3 only during the steady state part because the C3 strategy is a steady state solution. As shown in the figure, the PDC3 still works in the transient part and its performance is not very different from its performance in the steady state; yet it is not possible to compare it to C3. As described, a time window of 6T to 8T is allowed before applying the control; this is shown in FIG. 8A. During a WEC operation the frequencies change over time; when this change happens the FFT will be in a transient phase and the PDC3 is expected not to generate the same amount of energy as in the steady state mode. However, when this change in frequency occurs, the buoy runs into a transient phase in which the C3 method also is not guaranteed to be optimal. In such a real seaway this frequency change is occurring constantly and the rate and amount of change are unknown at any given time unless time-series prediction or deterministic prediction are used. See U. Korde, *Appl. Ocean Res.* 53, 31 (2015); and U. Korde et al., "Approaching maximum power conversion with exergy-based adaptive wave-by-wave control of a wave energy converter," *Proceedings of MTS/IEEE OCEANS*, Genova, Italy (2015). The PDC3 still poses a good performance during transient response periods using only a feedback control strategy.

Figure 15:
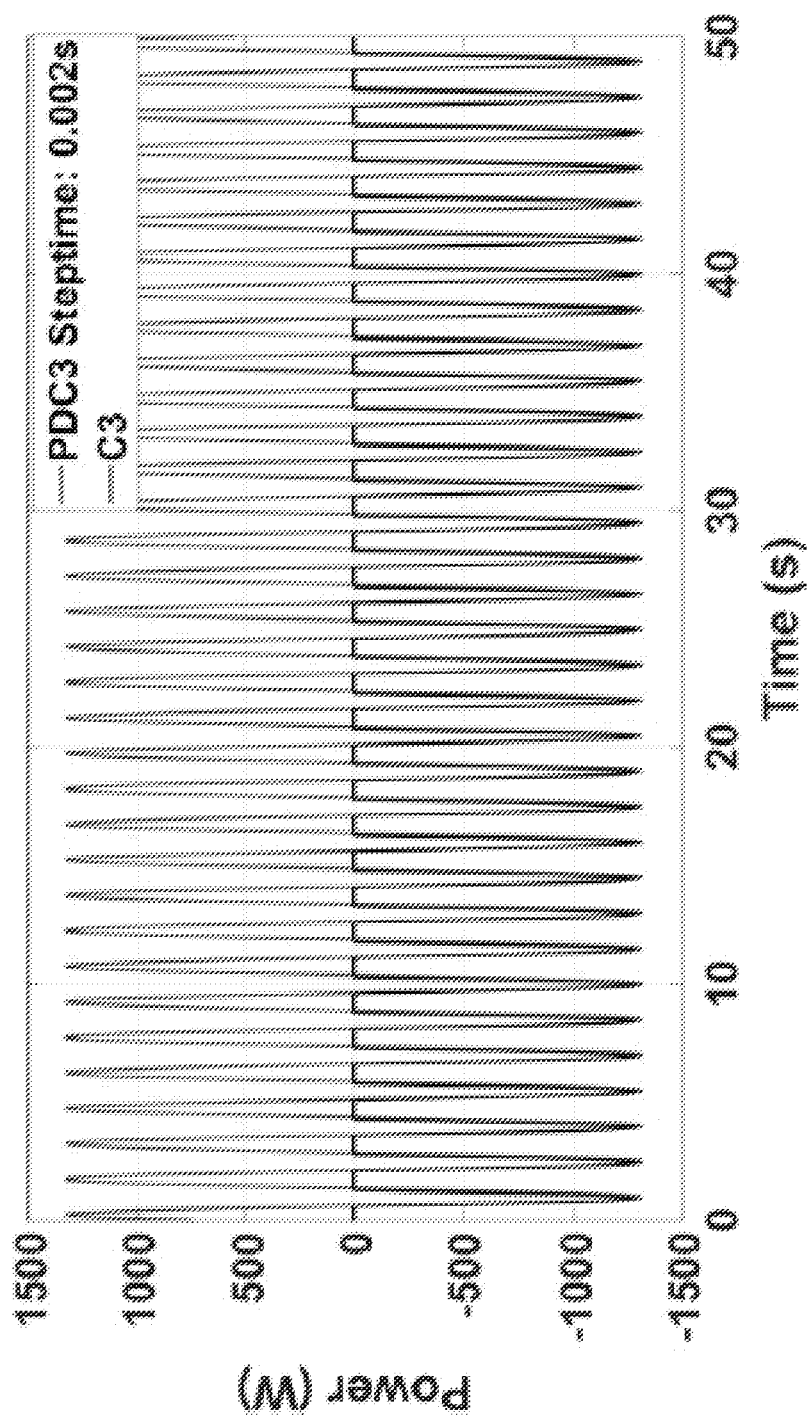
FIG. 15 is a graph of the reactive power for both the C3 and the PDC3.

The PDC3 control is equivalent to the C3 in terms of the required reactive power. This can be attributed to the fact that both controls are designed to resonate the system with the excitation force. The PDC3 has two components: a proportional (stiffness) control and a derivative (damping) control. The stiffness part of the control generates the reactive power of the PTO. This stiffness part is designed to resonate the velocity of the buoy with the excitation force; which is the same criterion used in designing the C3 control. FIG. 15 shows the power in the PDC3 due to the stiffness control only and the C3 reactive power; the reactive powers in both controllers are essentially the same given the numerical error in the PDC3. This conclusion can also be confirmed analytically if the reactive power terms are compared in both the $u_{C3}$ and the $u_{PDC3}$. The cosine terms in Eqs. (17) and (18) are the reactive power terms of the $u_{C3}$ and the $u_{PDC3}$, respectively, and both terms are equal.

The PDC3 control strategy is a feedback control strategy that requires measuring the buoy position and velocity. So, sensors for both position and velocity are needed to implement this control strategy. No prediction for the wave or excitation force is needed in the PDC3; yet the extracted energy is very close to that of the C3 in the numerical test cases described herein. The key is that the FFT (or any other filter) should be able to accurately identify the frequencies in the measured signal of the buoy position, as well as their amplitudes and phases. The number of extracted frequencies N dictates the optimality of the obtained solution.

Figures 16A, 16B:
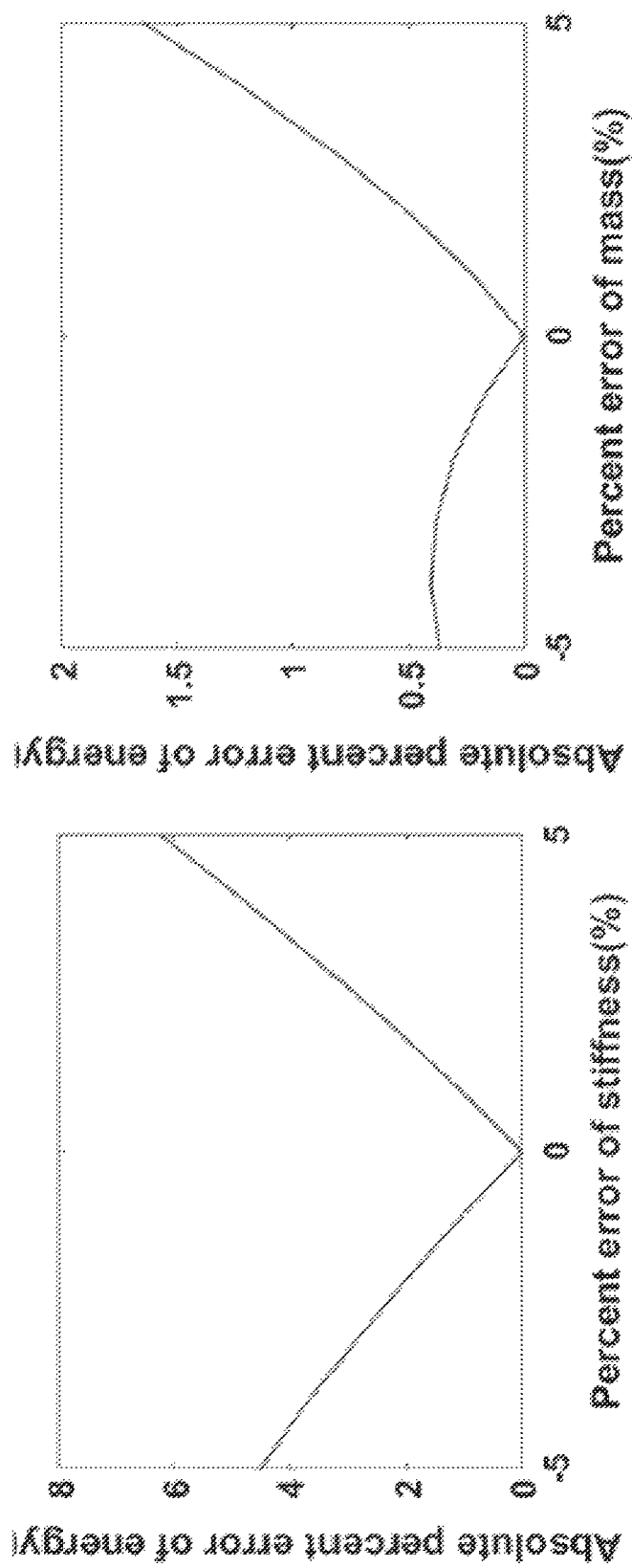
FIGS. 16A and 16B are graphs of numerical sensitivity tests showing the impact of uncertainties in model parameters on the harvested energy.

This description assumes a linear hydrodynamic model. The simulator also assumes a linear hydrodynamic model. All modelling errors due to the nonlinear hydrodynamics are not considered. The model, however, may have uncertainties in some of the parameters, e.g. the stiffness and the mass. To investigate the impact of these uncertainties on the harvested energy, a numerical analysis was conducted by allowing the controller to have an error within 5% in each of the mass and the stiffness parameters. The simulator is assumed to have the true values of these parameters. The results are shown in FIGS. 16A and 16B. As can be seen in these figures, an error within 5% of the stiffness parameter results in an energy drop within 6%. Also, an error within 5% of the mass parameter results in an energy drop within 2%.

The computational cost of the PDC3 algorithm is mainly due to the signal processing part since the control itself is a simple feedback logic. The signal processing part is described using FFT. However, the FFT might not be the most computationally efficient method to extract the frequencies. It is used herein to introduce the concept of PDC3 as a new control logic for WECs. More computationally efficient ways of carrying out the signal processing part are possible. For comparison, consider the recent WEC real-time controllers presented in Fusco and Ringwood and Hals et al. See F. Fusco and J. V. Ringwood, *IEEE Trans. Sustain. Energy* 4 (1), 21 (2013); and J. Hals et al., *J. Offshore Mech. Arctic Eng.* 133(1), 011401 (2011). The controller in Fusco and Ringwood tunes the oscillation of the system such that it is always in phase with the wave excitation. The controller is tuned based on a non-stationary harmonic approximation of the wave excitation force that is a function of a single instantaneous frequency, amplitude, and phase. Specifically, the approach consists of the generation of a reference velocity from knowledge of the current wave excitation force acting on the system, and then imposition of such velocity through a feedback control. Fusco and Ringwood did not discuss the computational cost of their method but it is clear that it also consists of two parts: the first part is the estimation of the excitation force in which an extended Kalman filter is used. The main advantage of the single instantaneous frequency approach presented in Fusco and Ringwood, however, is that the excitation force is assumed to have only one time-varying frequency. Hals et al. describe a procedure for the optimization of the control using a model predictive control approach. It repeatedly solves the optimization problem online in order to compute the optimal control on a receding horizon. The wave excitation force is predicted by use of an augmented Kalman filter based on a damped harmonic oscillator model of the wave process. Hals et al. did not discuss the computational cost of this method; but it is clear that it has two relatively computationally intense steps: the online optimization in the model predictive control calculations and the augmented Kalman filter step.

The size of the FFT depends on the complexity of the case study. For the Bretschneider case with 257 frequencies, the FFT size is 120; that is FFT is set to capture 120 frequencies. The FFT spectrum is discrete, it estimates the spectral level at specific frequencies, which are determined independently from the signal. As a result, peaks in the true spectrum may lie between the FFT frequencies. This is known as the Picket Fence Effect (PFE). Some references in the literature show how to eliminate the PFE using windowing, in which formulae are derived that compute the tones frequencies and amplitudes. See Y. F. Li and K. F. Chen, *Comput. Phys. Commun.* 178(7), 486 (2008). Also, windowing can be used to reduce the PFE and select the windowing type depending on the signal content. See National Instruments, "The Fundamentals of FFT-Based Signal Analysis and Measurement in LabView and LabWindows/CVI," Online, White Paper, June 2009. For instance, for a signal content that has sine wave or a combination of sine waves, Hanning windowing is recommended, which is adopted in this description. To reduce the error due to the PFE, an optimization step is carried out after extracting the frequencies, amplitudes, and phases, as described above. It is also noted that using a high sampling rate reduces the PFE. This description has implemented the FFT approach to extract the frequencies and their amplitudes from the measured signal, but FFT is not the only way to carry out this signal processing task.

The present invention has been described as multi-resonant control of a single degree-of-freedom wave energy converter. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A multi-resonant single degree-of-freedom wave energy converter, comprising:
    a buoy in a water environment having wave motion, wherein the waves impacting the buoy exert an excitation force with a plurality of excitation frequencies that causes a buoy motion in a heave direction relative to a reference,
    a sensor for measuring a position or velocity of the buoy relative to the reference for a sample period,
    a power take-off that is configured to apply a control force in the heave direction to the buoy and harvest the energy of the buoy motion, and
    a feedback controller that uses a signal processor to extracts a plurality of frequencies, amplitudes, and phases of the measured position or velocity of the buoy, computes a proportional-derivative control for each of the plurality of extracted frequencies, amplitudes, and phases, adds up each of the proportional-derivative controls to provide a computed control force, and causes the power take-off to apply the computed control force to the buoy to put the buoy heave motion in resonance with the excitation force.

2. The wave energy converter of claim 1, wherein the signal processor comprises a Fast Fourier Transform, Kalman filter, or least-squares processor.

3. The wave energy converter of claim 1, wherein the plurality of frequencies comprises at least three frequencies having the most significant amplitudes.

4. The wave energy converter of claim 1, wherein the sample period is 6 to 8 periods of one of the plurality of frequencies.

5. A method for proportional-derivate complex conjugate control of a wave energy converter, comprising:
    providing a multi-resonant single degree-of-freedom wave energy converter comprising a buoy in a water environment having wave motion, wherein the waves impacting the buoy exert an excitation force with a plurality of excitation frequencies that causes a buoy motion in a heave direction relative to a reference, a sensor for measuring a position or velocity of the buoy relative to the reference for a sample period, a power take-off that is configured to apply a control force in the heave direction to the buoy, and a feedback controller comprising a signal processor;
    measuring the position and velocity of the buoy relative to the reference over a sample period with the sensor;
    extracting a plurality of frequencies, amplitudes, and phases of the measured position or velocity of the buoy using the signal processor,
    computing a proportional-derivative control for each of the plurality of frequencies, amplitudes, and phases;
    adding up each of the proportional-derivative controls to provide a computed control force; and
    causing the power take-off to apply the computed control force to the buoy to put the buoy heave motion in resonance with the excitation force.

6. The method of claim 5, wherein the signal processor comprises a Fast Fourier Transform, Kalman filter, or least-squares processor.

7. The method of claim 5, wherein the plurality of frequencies comprises at least three frequencies having the most significant amplitudes.

8. The method of claim 5, wherein the sample period comprises 6 to 8 periods of one of the plurality of frequencies.

* * * * *